United States Patent [19]

Baca, Jr. et al.

[11] Patent Number: 5,583,757
[45] Date of Patent: Dec. 10, 1996

[54] METHOD OF INPUT SIGNAL RESOLUTION FOR ACTIVELY REDUNDANT PROCESS CONTROL COMPUTERS

[75] Inventors: Eloy Baca, Jr.; Wayne P. Dupree; Donald J. Grinwis, all of Midland, Mich.; Johannes C. Kanse, Biervliet, Netherlands; Douglas P. Pelletier; Oscar E. Schulze, both of Midland, Mich.

[73] Assignee: The Dow Chemical Company, Midland, Mich.

[21] Appl. No.: 925,089

[22] Filed: Aug. 4, 1992

[51] Int. Cl.$^6$ .................................................... G05B 9/02
[52] U.S. Cl. ............... 364/184; 395/183.13; 395/185.02; 364/187; 371/68.1
[58] Field of Search .................................... 364/131, 132, 364/133, 134, 135, 184, 187, DIG. 1, 186; 371/9.1, 68.1, 68.2, 68.3, 36, 67.1; 318/564; 395/183.13, 185.02

[56] References Cited

U.S. PATENT DOCUMENTS

| | | | |
|---|---|---|---|
| 3,654,603 | 4/1972 | Gunning et al. | 371/36 |
| 3,681,578 | 8/1972 | Stevens | 235/153 |
| 3,895,223 | 7/1975 | Neuner et al. | 235/153 AE |
| 4,105,900 | 8/1978 | Martin et al. | 307/219 |
| 4,304,001 | 12/1981 | Cope | 371/8 |
| 4,342,083 | 7/1982 | Freedman et al. | 364/200 |
| 4,375,683 | 3/1983 | Wensley | 371/36 |
| 4,583,224 | 4/1986 | Ishii et al. | 371/36 |
| 4,593,396 | 6/1986 | Anderson, Jr. | 371/68 |
| 4,663,704 | 5/1987 | Jones et al. | 364/188 |
| 4,683,105 | 7/1987 | Hager | 376/259 |
| 4,696,785 | 9/1987 | Cook | 371/36 |
| 4,787,041 | 11/1988 | Yount | 364/131 |
| 4,868,826 | 9/1989 | Smith et al. | 371/9.1 |
| 4,868,851 | 9/1989 | Trinidad et al. | 375/40 |
| 4,916,612 | 4/1990 | Chin et al. | 364/428 X |
| 4,958,270 | 9/1990 | McLaughlin et al. | 364/187 |
| 4,965,717 | 10/1990 | Cutts, Jr. et al. | 371/36 X |
| 4,995,040 | 2/1991 | Best et al. | 371/36 |
| 5,086,429 | 2/1992 | Gray et al. | 371/8.1 |
| 5,086,499 | 2/1992 | Mutone | 371/8.1 |
| 5,142,470 | 8/1992 | Bristow et al. | 364/184 |

FOREIGN PATENT DOCUMENTS

| | | |
|---|---|---|
| 271807 | 12/1988 | European Pat. Off. . |
| 2561410 | 9/1985 | France . |
| 2237904 | 5/1991 | United Kingdom . |
| 9305767 | 10/1993 | WIPO . |

OTHER PUBLICATIONS

Journal A, vol. 31, No. 4, Dec. 1990, Antwerp, BE pp. 33–40, XPoo178688, R. Cuyvers et al.

IEEE Spectrum, Jun. 1985, The X–29: Is It Coming Or Going?, Gadi Kaplan.

*Primary Examiner*—Roy N. Envall, Jr.
*Assistant Examiner*—Brian C. Oakes
*Attorney, Agent, or Firm*—Dale H. Schultz; William J. Coughlin

[57] ABSTRACT

A method of input signal resolution in a process control system where each of the actively redundant process control computers performs a common arbitration process on corresponding input signals. Blocks of corresponding input signals are mutually exchanged by the actively redundant process control computers, and an initial check is made to determine if these input signals are valid. For input signals representing valid analog values, a determination is made as to whether a predefined tolerance has been exceeded between corresponding input signals in the present process control cycle. When the predefined tolerance has been exceeded, then a check will be made to determine the predefined tolerance was also exceeded in the last process control cycle. If the predefined tolerance was not exceeded in the last process control cycle, then the analog input value selected during the last process control cycle will be employed in the present process control cycle. If the predefined tolerance was exceeded in both the present and the last process control cycle, then a predetermined magnitude criteria will be used to select the analog input value for use in making process control decisions. An indication will also be provided in each of the actively redundant process control computers to identify which of the corresponding input signals were selected by that process control computer.

20 Claims, 24 Drawing Sheets

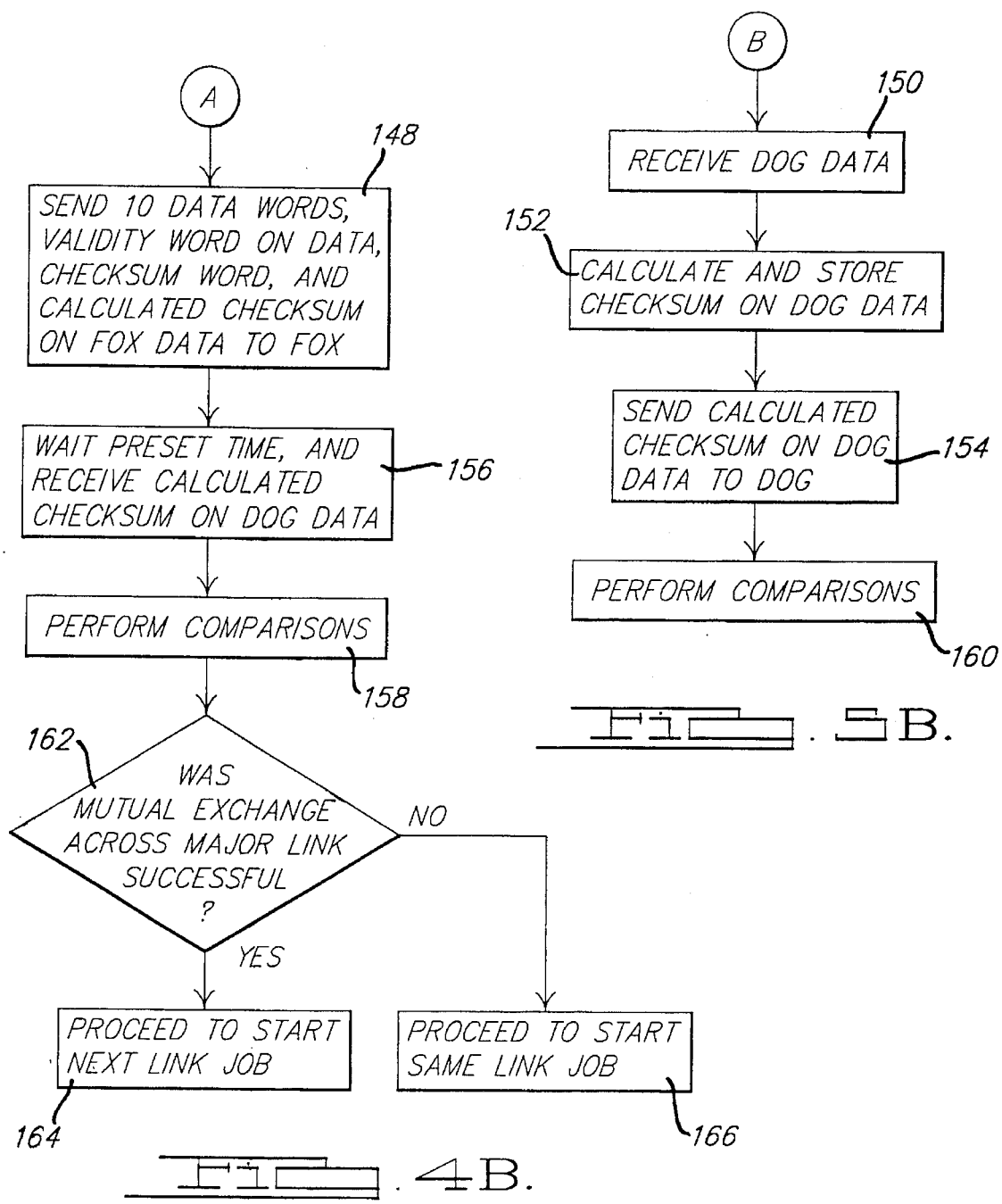

METHOD OF INPUT SIGNAL RESOLUTION FOR ACTIVELY REDUNDANT PROCESS CONTROL COMPUTERS

BACKGROUND OF THE INVENTION

The present invention generally relates to the operation of process control computers, and particularly relates to a method of resolving the selection of corresponding input signals received by each of a plurality of actively redundant process control computers.

In chemical manufacturing plants and other relatively large processing plants, a network of control computers and operator workstations may be needed to achieve automated control of an ongoing physical process in the plant. For example, the Jones et. al U.S. Pat. No. 4,663,704, issued on May 5, 1987, shows a distributed processing system for a plant in which a single data highway connects all the various input/output terminals, data acquisition stations, control devices, record keeping devices and so forth. Similarly, the Henzel U.S. Pat. No. 4,607,256, issued on Aug. 19, 1986, shows a plant management system which utilizes a plant control bus for the purpose of transmitting data to physical computer modules on the network.

In some of these process control computer networks, redundant process control computers are employed to enhance the reliability of the plant control and monitoring system. For example, the Fiebig et. al U.S. Pat. No. 5,008,805, issued on Apr. 16, 1991, shows a networked control system which includes a "hot standby" redundant processor that synchronously processes a control schedule table for comparison with control messages from a sender processor that are transmitted on the network. The redundant listener processor maintains a duplicate configuration in its memory ready to take over control of the system in the event of a failure of the sender processor. As another example, the McLaughlin et. al U.S. Pat. No. 4,958,270, issued on Sep. 18, 1990, shows a networked control system which employs a primary controller and a secondary controller. In order to maintain consistency between the primary data base and a secondary image of the data base, only predetermined areas changed are updated as a way of increasing the efficiency of the update function. Similarly, the Slater U.S. Pat. No. 4,872,106, issued on Oct. 3, 1989, shows a networked control system which employs a primary data processor and a back-up data processor. Normally, the back-up processor will be in a back-up mode of operation, and it will not operate to exercise control over the input/output devices or receive data concerning the states of the input/output devices. Accordingly, control over the input/output devices is exclusively carried out by the primary processor. However, the primary processor periodically transfers status data relating to its operation in the control of the input/output devices to the back-up data processor via a dual ported memory connected between the two processors.

In contrast with the above networked control systems, another control technique for redundant process control computers exists in which both of the process control computers operate on input data and issue control commands to the same output devices. This type of control technique may be referred to as active redundancy, because each of the redundant process control computers operate independently and concurrently on common input data. A discussion of this type of control technique may be found in the Glaser et. al U.S. Pat. No. 5,428,969, entitled "Process Control Interface System Having Triply Redundant Remote Field Units". This application is hereby incorporated by reference.

The use of active redundancy as a control technique presents a challenging problem where it is desired to arbitrate or resolve some or all of the input values for the process control computers, to the extent that differences in corresponding input values are found to exist. While each of the actively redundant process control computers will independently make process control decisions and generate their own output values, it may nevertheless be desirable to coordinate the input signals received by these actively redundant process control computers, so that the process control computers operate on the same input data. In this regard, it is possible for the actively redundant process control computers to receive corresponding or common input signals with different values.

These differences in input signal values may result from a variety of factors, such as a difference in the tolerance between the input circuits used to process an input signal from a single sensor. Additionally, a difference could arise from a transient condition associated with the transfer of the input signals across separate transmission paths. Furthermore, a fault in the reception, initial processing or transmission of an input signal could also cause a difference between corresponding input signals received at the actively redundant process control computers. It any event, it should be appreciated that it may be considered appropriate for each of the actively redundant process control computers to be aware of these situations, and that a collective response to these situation may well be inadequate.

Additionally, it should be appreciated that the coordination of input signals will raise complexities in both the ability of relatively independent process control computers to work together and the amount of processing time and effort required to enable this coordination to be realized.

Accordingly, it is a principal objective of the present invention to provide a method of individually and rapidly resolving the selection of corresponding input signals by each of a plurality of actively redundant process control computers.

It is another objective of the present invention to provide a method of input signal resolution which enables a front end determination to be made as to which input signal was selected by each of the actively redundant process control computers.

It is a further objective of the present invention to provide a method of input signal resolution for a plurality of actively redundant process control computers which includes a fault tolerant response to differences in magnitude between corresponding analog input signals.

It is an additional objective of the present invention to provide a method of input signal resolution for a plurality of actively redundant process control computers which has the capability of checking the validity of an exchanged set of input signals.

It is yet another objective of the present invention to provide a method of input signal resolution which enables input signals to be exchanged without interrupting the central processing units of the actively redundant process control computers.

It is also an objective of the present invention to provide a method of input signal resolution for a plurality of actively redundant process control computers which records a plurality of diagnostic signals during the arbitration process.

SUMMARY OF THE INVENTION

In order to achieve the foregoing objectives, the present invention provides a method of input signal resolution in a process control system where each of the actively redundant process control computers performs a common arbitration process on corresponding input signals. Each of the actively redundant process control computers individually receives a corresponding set of input signals which represent analog and digital values from the physical process being controlled. In one form of the present invention, blocks of corresponding input signals are mutually exchanged by the actively redundant process control computers in order that each of the actively redundant process control computers may individually perform the arbitration process with the same set of input data. An initial check is then made to determine if these input signals are valid.

For input signals representing valid analog values, a determination is made as to whether a predefined tolerance has been exceeded between corresponding input signals in the present process control cycle. When the predefined tolerance has not been exceeded, each of the actively redundant process control computers will select one of the valid analog input signals based upon a predetermined selection criteria. However, when the predefined tolerance has been exceeded, then a check will be made to determine if the predefined tolerance was also exceeded in the last process control cycle. If the predefined tolerance was not exceeded in the last process control cycle, then the analog input value selected during the last process control cycle will be employed in the present process control cycle. If the predefined tolerance was exceeded in both the present and the last process control cycle, then a predetermined magnitude criteria will be used to select the analog input value for use in making process control decisions.

Additionally, an indication will be provided in each of the actively redundant process control computers to identify which of the corresponding input signals were selected by that process control computer. This indication of the result of the arbitration process will enable an operator to make appropriate adjustments when it is desired to take one of the actively redundant process control computers off line for service.

The present invention also provides an input signal resolution method for a process control system in which one or more triply redundant field computer units are used to gather input data and perform an initial arbitration process. In this case, one or more blocks of pre-arbitrated input signals are separately transmitted from individual computers in the triply redundant field computer unit to different ones of the actively redundant process control computers. In other words, each of the actively redundant process control computers receives a corresponding set of pre-arbitrated input signals from a different one of the computers in the triply redundant computer unit. Then, a determination is made as to whether a predefined tolerance has been exceeded between the analog values of the transmitted signals at each of the actively redundant process control computers. If the predefined tolerance has been exceeded, then a predetermined magnitude criteria will be used to individually select the analog input value at each of the actively redundant process control computers.

Additional features and advantages of the present invention will become more fully apparent from a reading of the detailed description of the preferred embodiment and the accompanying drawings in which:

BRIEF DESCRIPTION OF THE DRAWINGS

FIGS. 4A–4B and 5A–5B provide set of flow charts which illustrate the mutual exchange of corresponding input signals by the actively redundant process control computers.

FIGS. 6A–6C provide a set of flow charts which illustrate the analog input signal resolution method according to the present invention when initial arbitration has been performed in a triply redundant remote computer unit.

FIGS. 8A, 8B, 8C, 8D, 8E, 8F, 8G and 8H provide a set of flow charts which illustrate the analog input signal resolution method according to the present invention when initial arbitration has not already been performed.

DETAILED DESCRIPTION OF THE PREFERRED EMBODIMENTS

Figure 1:
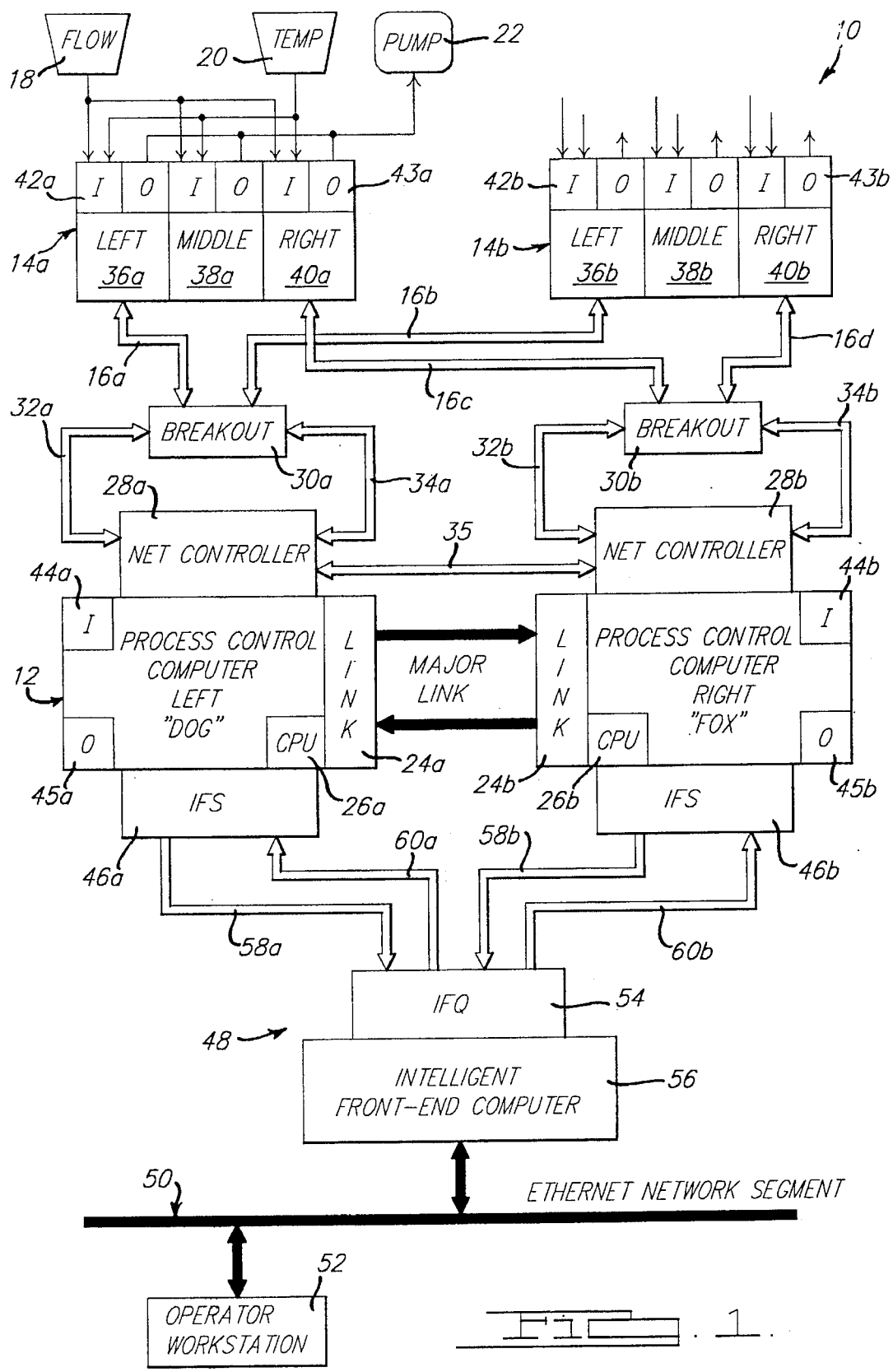
FIG. 1 is a block diagram of an actively redundant process control computer system in the context of the present invention.

Referring to FIG. 1, a block diagram of an actively redundant process control computer system 10 according to the present invention is shown. The system 10 includes a pair of actively redundant process control computers 12a–12b. Each of the process control computers 12a–12b receive common input data from one or more field computer units, such as field computer units 14a–14b. These field computer units may be located remotely from the actively redundant process control computers 12a–12b, as illustrated by the fiber optic cables 16a–16d. In this regard, the Glaser et. al. U.S. Pat. No. 5,428,769, referenced above, describes in detail the communication and control links between a pair of actively redundant process control computers, such as process control computers 12a–12b, and the input/output devices directly associated with the physical process being controlled. Alternatively, local field instrumentation may be used to more directly connect the process control computers 12a–12b with the input sensors, such as the flow rate sensor 18 and the temperature sensor 20.

While the redundancy of two actively operating process control computers has certain fault tolerance advantages over a single decision making process control computer, it should be understood that the principles of the present invention are not limited to a configuration of two actively redundant process control computers. Thus, for example, it may be desirable to employ three process control computers in the place of the two process control computers 12a–12b shown in FIG. 1 under the appropriate circumstances.

In the present embodiment, the process control computers 12a–12b preferably operate concurrently on all of the signals transmitted from one or more field computer units. In other words, each of the process control computers 12a–12b are capable of making independent decisions based upon the data received by these redundant computers from the field.

The decisions made by the process control computers 12a–12b determine the output signal values which are ultimately directed to specific output devices (e.g., valves, pump motors and reactor heaters) by the appropriate field computer units. In this regard, a pump 22 is shown in FIG. 1 to illustrate one type of output device that may be controlled by the system 10.

While the output signal values could be reconciled between the two actively redundant process control computers 12a–12b, it should be understood that two independent sets of output signal values could otherwise be communicated to the field computer units 14a–14b. In this regard, the input values received from a field computer unit could be arbitrated, which should make it unnecessary to reconcile or arbitrate output values. This is because both of the process control computers 12a–12b would then be working with the same process control program and operating on the same set of arbitrated input values.

To facilitate the input signal arbitration or reconciliation process, a parallel communication link 24 is provided between the process control computers 12a–12b. Parallel communication link 24 is referred to as the "major" link, as it permits a direct transfer of data and timing signals between the process control computers. It should also be noted that the Left process control computer 12a is labeled "dog", while the Right process control computer 12b is labeled "fox". These are logical designations for alternative operating modes of the process control computers 12a–12b.

While each of the process control computers 12a–12b make independent decisions, which may be subject to arbitration, the process control computer currently in the fox mode has the ability to force the process control computer in the dog mode to move to a subsequent step in a sequence of steps associated with the operation of a manufacturing process in order to keep the cooperative efforts of the two process control computers in relative synchronization. Additionally, the process control computer in the fox mode will transmit a timing signal to the process control computer in the dog mode at the beginning of its process control program cycle (e.g., a one second period), so that the process control computer in the dog mode will know to begin a new process control program cycle as well. As the process control computers 12a–12b operate under their own clock oscillators, the detection and interpretation of this program cycle timing signal by the process control computer in the dog mode will help to periodically keep these process control computers in relative synchronization. However, it should be appreciated that the program cycle of the process control computer in the dog mode will typically follow the program cycle of the process control computer in the fox mode by the period of time it takes to transmit and then detect the program cycle timing signal (e.g., 20 microseconds to 1–2 milliseconds).

In the event that process control computers 12a–12b are temporarily not able to communicate over the major link 24, each of these process control computers will continue their operations in a mode which assumes that they are operating alone. As will be more fully described in connection with FIG. 2, each of the process control computers 12a–12b includes a link circuit for controlling bi-directional signal communication between these process control computers. Accordingly, FIG. 1 shows a link circuit 24a contained in or otherwise coupled to the process control computer 12a, as well as a link circuit 24b contained in the process control computer 12b. As these link circuit are preferably identical in construction, the link circuits 24a–24b will sometimes be generically referred to herein as link circuit 24. This same referencing procedure will also be used herein to generically refer to other preferably identical components in the actively redundant process control system 10.

FIG. 1 also shows that each of the process control computers 12a–12b include a central processing unit 26. In the present embodiment, the central processing unit 26 preferably based upon a Harvard architecture, as this architecture permits both an op-code instruction and the operand data for this instruction to be fetched in the same clock cycle. This is because a computer based upon the Harvard architecture includes physically separate instruction and data stores, and each of these stores have their own address and data lines to the central processing unit. In contrast, with computers based upon the von Neumann architecture, it typically takes several computer clock cycles to fetch, decode and execute an instruction.

Each of the process control computers 12a–12b includes a network controller 28a–28b to facilitate communication with the field computer units 14a–14b. Each network controller 28a–28b is in turn connected to one or more breakout circuits 30 via fiber optic cables 32, 34. The breakout circuits 30 direct input signals from field computer units 14a–14b to the network controller 28. Similarly, the breakout circuits 30 direct output signals from the network controller 30 to the appropriate field computer units 14a–14b. In the case of a large process control system 10 which has many field computer units 14, it should be noted that several breakout circuits 30 may be connected in series to form a communication ring around the network controller 28. Additionally, a second level of breakout circuit 30 may also be connected breakout circuits forming the communication ring in order to further distribute bi-directional signal communication between the process control computers 12a–12b and each of the field computer units 14 needed in the system 10. Furthermore, it should also be noted that the network controller 28 is preferably capable of using either of the fiber optic cables 32, 34 to conduct bi-directional communication with the breakout circuits 30 on the communication ring level.

As shown in FIG. 1, the breakout circuit 30a is preferably connected to both the left computer circuit 36a of the field computer unit 14a and the left computer circuit 36b of the field computer unit 14b. Similarly, the breakout circuit 30b is preferably connected to both the right computer circuit 40a of the field computer unit 14a and the right computer circuit 40b of the field computer unit 14b. In this way, the left process control computer 14a will receive input signals from all of the left computer circuits 36 in the field computer units 14, while the right process control computer 14b will receive input signals from all of the right computer circuits 40 in the field computer units. Accordingly, it should be appreciated that two separate fiber optic based communication networks are provided between the process control computers 12a–12b and the field computer units 14, even though each of the process control computers are coupled to each of the field computer units.

While the middle computer circuits 38a–38b of the field computer units 14 do not communicate directly with any of the process control computers 12a–12b, the middle computer circuits 38 do communicate directly with the left and right computer circuits in their respective field computer units. Additionally, in the event that three process control computers 12 were to be employed, it should be appreciated that the middle computer circuits 38 could then communicate directly with this third process control computer. As shown in FIG. 1, the middle computer circuits 38 do receive all of the corresponding input signals that the left and right computer circuits receive from the various sensors, such as the flow rate sensor 18 and the temperature sensor 20. Similarly, the middle computer circuits are also connected to each of the output devices to which the left and right computer circuits are connected, such as the pump 22.

These input and output connections are made through one or more input circuits, such as input circuit 42a, and one or more output circuits, such as output circuit 43a. In this regard, each of the left, right and middle computer circuits include corresponding input and output circuits. In this way, each of the left, right and middle computer circuits in the field computer unit 14 are able to perform initial input signal arbitration and final output arbitration. For example, the input signal from the flow rate sensor 18 will be processed by each of the corresponding input circuits, such as input circuit 42a. Then, the left, right and middle computer circuits will exchange the corresponding flow rate input signals in turn via serial communication lines. Each of the left, right and middle computer circuits will then make independent decisions as to value of the flow rate input signal. Finally, the left computer circuit 36a will transmit its flow rate value to the left process control computer 12a, while the right computer circuit 40a will transmit its flow rate value to the right process control computer 12b.

Even though the left and right computer circuits preferably perform an initial arbitration process, it should be appreciated that these computer circuits could possibly arrive at different results. Such differences could arise from the operation of the corresponding input circuits or a temporary inability of the computer circuits in the field computer unit 14 to communicate with each other. Additionally, a fault could also arise in the operation of one or more of the computer circuits contained in the field computer unit 14. While it is preferred that each of the left, right and middle computer circuits receive data from each input sensor, it is also possible that separate, but corresponding sensors could be provided for each of these computer circuits to measure any given input parameter. In such a case, the sensors themselves could produce different input values, even though they are intended to observe the same physical phenomena. Accordingly, it should be appreciated that the left process control computer 12a and the right process control computer 12b could receive different values for corresponding input signals, such as the values for the corresponding flow rate signals.

While the process control computers 12a–12b could receive all of their input signals from one or more field computer units 14, they may also receive input signals from directly connected input circuit boards, either as an alternative to the field computer units 14 or in addition to the input signals received from the field computer units. Thus, for example, the process control computer 12a is shown to include an input circuit board 44a and an output circuit board 45a. While the input circuit board 42a in the field computer unit 14a may be used to receive analog input signals, the input circuit board 44a may be used to receive digital input signals. However, it should be appreciated that the field computer units 14a–14b and the process control computers 12a–12b may be provided with both analog and digital input circuit boards, as well as analog and digital output circuit boards.

Each of the process control computers 12a–12b also include an IFS circuit 46 to facilitate communication with an intelligent front end communication system 48. The front end communication system 48 provides an intelligent interface between the process control computers 12a–12b and a plant-wide or local-area network 50. In other words, the front end communication system 48 provides a way to rapidly transfer input and/or output data from the process control computers 12a–12b to one or more network entities, such as the operator workstation 52. similarly, the front end communication system 46 enables an operator to send command signals to one or both of the process control computers 12a–12b.

The front end communication system 48 includes the IFS circuits 46a–46b, an IFQ circuit 54 and a front end computer 56. The IFS circuit 46 provides an interface to the "Stealth" port of a dual-ported data memory contained in the process control computer 12, while the IFQ circuit 54 provides an interface to the Q-bus of the front end computer 56. In the embodiment disclosed herein, the front end computer 56 is preferably a MICROVAX 3400 computer using the real-time ELN operating system from the Digital Equipment Corporation. The front end communication system 48 also provides a fiber optic communication link between the IFS circuits 46a–46b and the IFQ circuit 54. In this regard, at least one optical fiber 58a is used to enable signal communication from the IFS circuit 46a to the IFQ circuit 54, while another optical fiber 60a is used to enable signal communication from the IFQ circuit to this IFS circuit. It should also be noted that redundancy may be provided in the front end communication system 48 by including an additional IFQ circuit 54 and front end computer 56 combination. A further description of the front end communication system 48 may be found in de Bruijn U.S. patent application Ser. No. 07/898,923, filed on Jun. 12, 1992, entitled "Secure Front End Communication System and Method for Process Control Computers". This patent application is hereby incorporated by reference.

Figure 2:
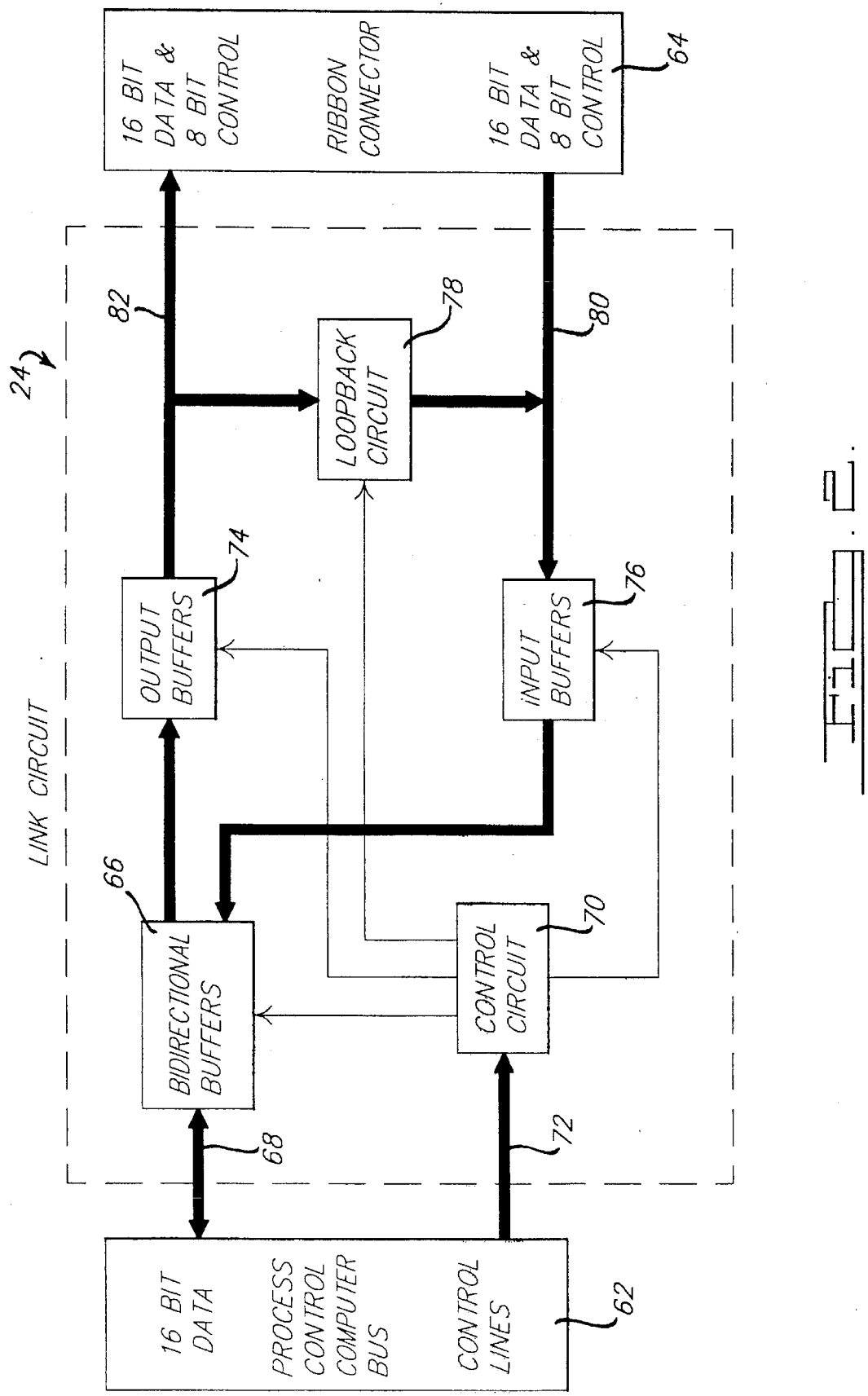
FIG. 2 is a block diagram of the link circuit shown in FIG. 1.

Referring to FIG. 2, a block diagram of the link circuit 24 is shown. The link circuit 24 is connected to the bus structure 62 of the process control computer 12 at one end, and the link circuit is connected to a ribbon connector 64 at the other end. It should be noted at this point that two identical link circuits 24 could be provided at each of the process control computers 12a–12b in order to build redundancy into the major link between the process control computers.

The link circuit 24 includes a block 66 labelled "bi-directional buffers" which is connected to a 16-bit data bus 68 of the process control computer 12. In one embodiment according to the present invention, the bi-directional buffers 66 may be comprised of two 8-bit buffers (74ALS640), which are capable of receiving and transmitting data on the data bus 68. The link circuit 24 also includes a control circuit 70, which is connected to a set of control lines 72 from the process control computer 12. In this regard, the control circuit 70 may be comprised of a Programmable Array Logic "PAL" circuit (22V10). The control circuit 70 is used to decode signals transmitted on the control lines 72, in order to selectively access one or more of the other circuits contained in the link circuit 24. For example, the control circuit 70 will send an enable signal and a input/output signal to the bi-directional buffers 66 when data is to be transmitted or received across the data bus 68.

The link circuit 24 also includes a set of output buffers 74 and a set of input buffers 76. The output buffers 74 may be comprised of three octal latches (74ALS576), while the input buffers may be comprised of three octal tri-state buffers (74HC540). Two of the latches in the output buffers 74 are used to provide a set of 16-bit output data lines to the ribbon connector 64, while the remaining latch is used to provide a set of 8-bit code lines to the ribbon connector. Similarly, two of the input buffers 76 are used to provide a set of 16-bit input data lines from the ribbon connector 64, while the remaining buffer is used to provide a set of 8-bit code lines from the ribbon connector. The link circuit 24 may also include a loopback circuit 78, which is interconnected between the input data/code lines 80 and the output data/code lines 82. The loopback circuit provides a path to test the functionality of the link circuit 24. The loopback circuit 78 may be comprised of a set of three octal tri-state buffers (74HC541).

While the loopback circuit 24 could also include an additional line for sending an interrupt signal to the central processing unit 26 of the process control computer 12, the use of interrupt signals across the major link are not required in accordance with the method of the present invention. In this regard, it is preferred that each of the process control computers 12a–12b include a precision, oven controlled oscillator as a source of accurate clock frequency signals for several distinct time domains. For example, the oscillator is used to increment a 12-bit up counter, which provides a Real Time Clock "RTC". When the RTC times out, an interrupt signal will be generated to create a Hz1200 time domain (i.e., a interrupt every 0.83 milliseconds). A Hz1200 routine is also provided to adjust the RTC to the number of instruction cycles needed to generate the next Hz1200 interrupt. More specifically, the value of a counter referred to as INTCYC is added to the current value of the RTC counter to adjust for interrupt latency. Next, the Hz1200 routine tests the value of a counter referred to as CC300 to determine if it is time to execute an Hz300 interrupt routine.

In order to provide phase locking in the Hz300 time domain, a 60 Hz square wave signal is produced from a precision crystal. A transition is detected by reading a voltage comparator to provide 60 Hz phase locking. Since a 60 Hz transition should be detected every 5th Hz300 interrupt, a counter referred to as CYCLE is set up to count the Hz300 interrupt loops. A memory location referred to as LAST is used to contain the bit value of the comparitor's 60 Hz detect last Hz300. Whenever a 60 Hz transition is detected from Low to High, the following test will be performed. If the 60 Hz transition is detected when CYCLE is 4, then the value of INTCYC is incremented by 1, because an early detection was made. If the 60 Hz transition is detected when CYCLE is 5, then this represents the ideal condition, and no clock signal correction is performed. If the 60 Hz transition is detected when CYCLE is 6, then INTCYC is decremented by 1, because a late detection occurred. After any one of these three conditions is met, then CYCLE is zeroed. If a 60 Hz transition is detected when CYCLE is any other value or if not detected, then no phase locking is performed until the testing described above results in the detection of two ideal conditions in a row.

However, it should be noted that 60 Hz phase locking is not performed in a process control computer 12 which is in the dog mode. Rather, a fixed value is used for the INTCYC counter. Additionally, a pseudo Hz150 time domain is created in both the fox and dog process control computers by toggling a bit referred to as PHZ. When PHZ is Low, or Hz150, both process control computers 12a–12b toggle a SSTART line of the major link code lines. The dog process control computer (e.g. process control computer 12a) will immediately read the SSTART line, and it will make phase corrections at Hz150 to lock onto the frequency of the fox process control computer (e.g., process control computer 12b). This phase correction is accomplished by changing the current value in the RTC counter with a +/−64 counts. This rapid adjustment will be made every Hz150 in either the positive or negative direction, depending upon whether the dog is lagging or leading the fox.

When a process control computer is first started, it will preferably come up in the dog mode, and it will wait for a Beginning of Second "BOS" signal by monitoring a FBOS bit on the major link code lines. This bit is toggled at the beginning of a second (i.e., a new process control cycle) by both of the process control computers 12a–12b. As soon as the FBOS signal is detected, then the dog process control computer will start running its normal one second process control time line in order to align itself with the fox process control computer. If no fox process control computer is detected, then after a suitable period of time (e.g., 5 seconds) the dog process control computer will elevate to an operating mode where it is assumed that it is the only currently operational process control computer.

Figure 3:
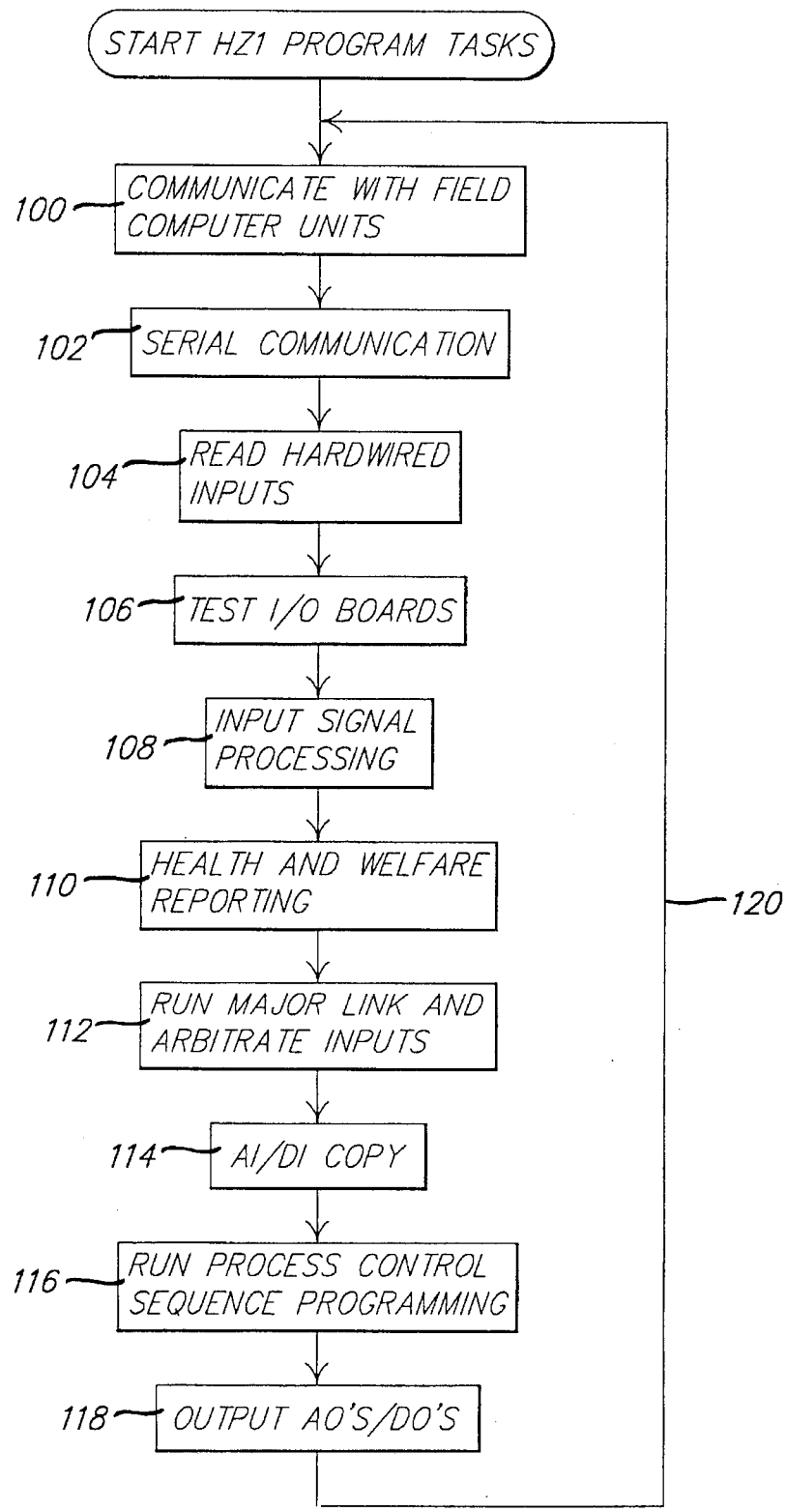
FIG. 3 is a flow chart which illustrates the sequence of program tasks in the Hz1 time domain.

Referring to FIG. 3, a flow chart of the sequence of the program tasks performed in the Hz1 time domain is shown. In this regard, it should be noted that this flow chart does not depict all of the possible tasks that may be performed in the Hz1 time domain (e.g., driving data displays). Rather, this flow chart serves to provide a general overview of the sequence of tasks which are programmed into the process control computers 12. At the beginning of a one second process control cycle, the process control computer 12 conducts bi-directional communication with the field computer units 14 via the network controller 28 (block 100). More specifically, the process control computer will transmit the appropriate output signals to the field computer units 14, which were determined during the last process control cycle (i.e., the previous second). Then, the process control computer will request the field computer units 14 to send their arbitrated input signals for the present process control cycle.

As generally indicated by block 102, the network controllers 28a–28b may then conduct communications with each other over a fiber optic serial communication link 35 (shown in FIG. 1). Another serial communication link may be used, for example, to transfer process status data to other process control computers. While this data is generally treated the same as calculated values, it should be noted that this data could also be treated as another form of input data to be subject to resolution as set forth below.

Next, the process control computer 12 will read the input signals from any input circuits which are connected directly to the process control computer (block 104). Regardless of the origin of the input signals, it should also be noted that the input signals will generally be comprised of a set of analog input "AIF" signals, a set of digital input "DIF" signals, a set of analog output track "AOT" signals and a set of digital output track "DOT" signals. The AIF and DIF signals represent input signal values received from the field instrumentation, with the AIF values being in engineering units. The AOT and DOT signals represent feedback signals used to verify the output signals transmitted to the output devices (e.g., pumps, valves and switches) which physically control the chemical production or manufacturing process.

Assuming that the process control computer 12 has one or more input/output "I/O" circuit boards connected to it (e.g., input circuit 44a), then a test will be performed to determine if the process control computer is able to properly communicate with these I/O circuits (block 106). Then, the input signals received will undergo programmed processing steps, such as linearization and scaling (block 108). Next, the process control computer 12 will prepare suitable health and welfare reports on the input signals (block 110). In this regard, various problem bits will be reported, such as the "BAIXL" bit to indicate that the analog input circuit board for the left process control computer 12a is out of service.

The process control computer 12 will then perform an exchange of processed input signals from the field across the major link, and arbitrate/resolve the exchanged signals (block 112). This method of exchanging signals across the major link will be described in connection with the flow charts of FIGS. 4A–5B. The method of arbitrating/resolving these input signals will be described in connection with the flow charts of FIGS. 6A–9E. Then, an AI/DI copy routine 114 will be performed, which will be described in connection with FIGS. 10 and 11.

Once all of these procedures have been performed, then the process control computer 12 will run the programmed sequences which determine the necessary output values from the exchanged and arbitrated/resolved input values (block 116). Finally, the process control computer 12 will transmit the analog output "AO" and "DO" signals required for any I/O circuits were are directly connected to the process control computer (e.g., output circuit 45a). At this point, the process control computer may perform any remaining Hz1 tasks that are not otherwise required to be performed or completed within the process control cycle (e.g., one second). For example, a process control program from one of the process control computers 12a–12b could be transferred upon request to the other process control computer during the time which may be remaining in the process control cycle to accomplish a program load. Then, as indicated by the return line 120, the process control computer will return to the starting position in order to wait for the beginning of the next process control cycle.

Figures 4A, 5A:
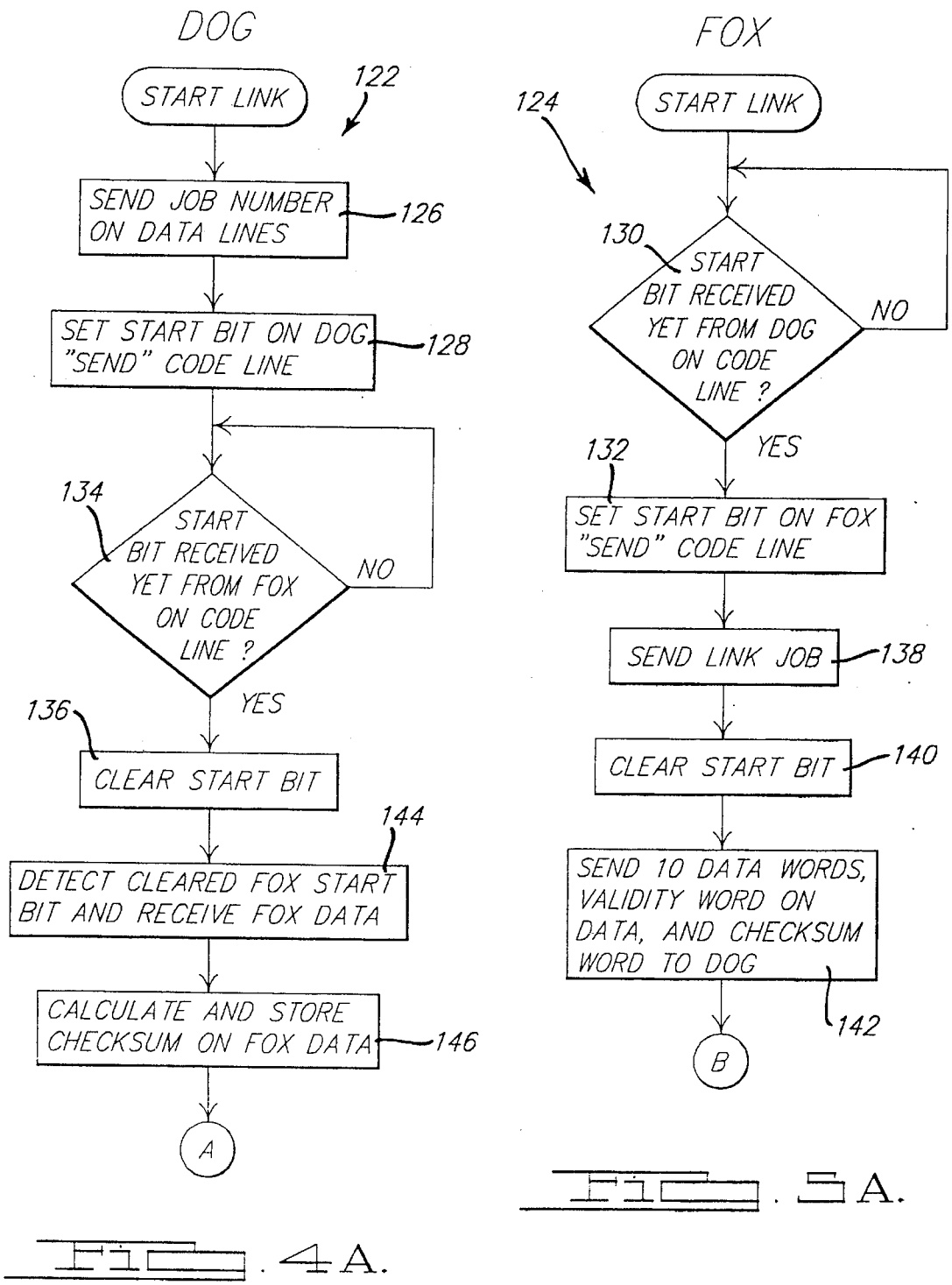
Figure 5A:
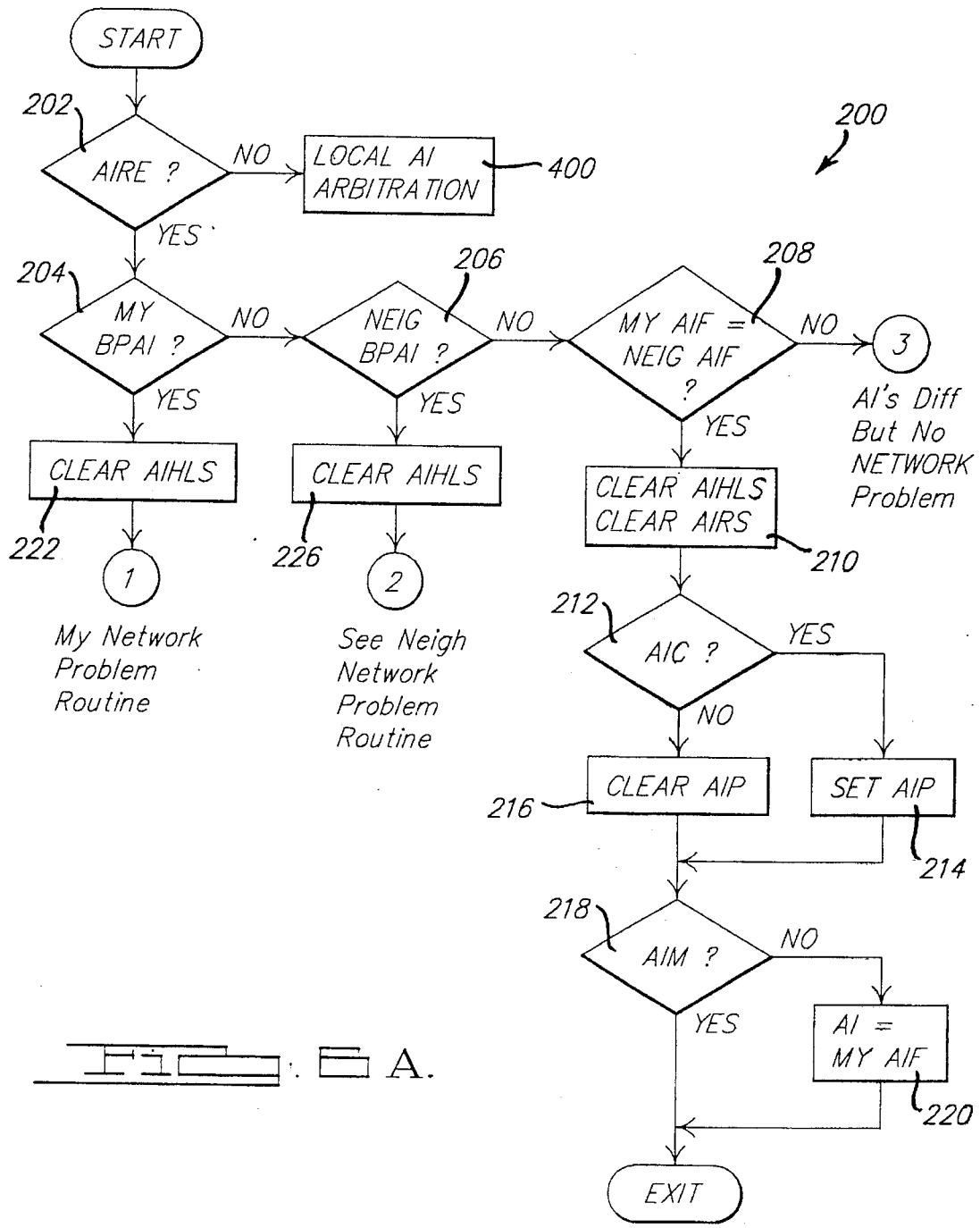

Referring to FIGS. 4A–4B and 5A–5B, a set of flow charts is shown to illustrate the mutual exchange of corresponding input signals by the actively redundant process control computers 12a–12b. FIGS. 4A–4B represent the major link method 122 employed by the process control computer which is currently in the dog mode (e.g., process control computer 12a). Similarly, FIGS. 5A–5B represent the major link method 124 employed by the process control computer which is currently in the fox mode (e.g., process control computer 12b). Accordingly, FIGS. 4A–4B and 5A–5B are shown generally side by side, as these methods are inter-related in time and operation.

The dog process control computer 12a begins the major link exchange by sending a link job number on the data lines of the output data/code lines 82 of the link circuit 24 (block 126). In one embodiment according to the present invention, the job number may be used to represent the starting address of a set of data words to be exchanged. In this way, each of the process control computers 12a–12b may be programmed with a link list of corresponding memory address locations in a data table which should be mutually exchanged.

Next, the dog process control computer 12a will set a start bit on its "send" code line in the output data/code lines 82 in order to let the fox process control computer 12b know that it is ready (block 128). Due to the close timing relationship between the process control computers 12a–12b, as described above, the fox process control computer 12b will know when to begin looking for the link job number and the start bit from the dog process control computer 12a (diamond 130). Once this start bit has been received, the fox process control computer will set its start bit as well (block 132). The dog process control computer 12a will be looking for the fox's start bit (diamond 134), and it will respond by clearing its start bit and waiting for the fox's start bit to clear (block 136).

Meanwhile, due to the tightly controlled timing relationship of the major link method, the fox process control computer 12b will send its link job number to the dog process control computer (block 138) and clear its start bit (block 140). Once these two steps are accomplished, the fox process control computer 12b will begin to send the first block or berth of data to the dog process control computer 12a (block 142). In one embodiment according to the present invention, this berth of data may be comprised of up to ten 16-bit data words, a goodness word which is indicative of the validity of the ten data words, and a checksum of this berth of data transmitted.

The dog process control computer 12a will detect the clearing of the fox's start bit and it will immediately begin receiving the fox's link job number and the berth of data set forth above (block 144). The dog process control computer 12a will then calculate its own checksum on the data received from the fox process control computer 12b (block 146). Thereafter, the dog process control computer 12a will immediately send its berth of data to the fox process control computer 12b (block 148 shown in FIG. 4B). This berth of data will include up to ten 16-bit data words, the goodness word on the validity of this data, a checksum of this berth of dog data, and the checksum that the dog calculated on the fox's berth of data.

The fox process control computer 12b will receive the dog's berth of data (block 150), and calculate its own checksum on the data received (block 152). The fox process control computer 12b will then send this calculated checksum to the dog process control computer 12a (block 154). After the dog process control computer 12a has transmitted its berth of data, it will then wait a preset period of time in order to receive the checksum that the fox calculated on the dog's berth of data (block 156). In this regard, it should be noted that this period of time, as well as other suitable waiting times in the major link method, may be related to the number of central processing unit instructions it takes to accomplish these steps.

Then, as illustrated in FIGS. 4B and 5B, both of the process control computers 12a–12b will perform a series of comparisons from the resulting exchange of data (blocks 158–160). These comparisons include (a) a comparison of the link job numbers, (b) a comparison of the checksum sent with the fox's berth of data vs. the checksum that the dog calculated on this data, and (c) a comparison of the checksum sent with the dog's berth of data vs. the checksum that the fox calculated on this data. Assuming that all of these comparisons matched, then the mutual exchange will be determined as successful (diamond 162), and the dog process control computer 12a will begin another major link exchange with the next link job number (block 164). If the exchange was determined to be unsuccessful, then the dog process control computer will begin another major link exchange with the same link job number as used in the unsuccessful exchange (block 166). In this way, the dog process control computer 12a will attempt to repeat the same major link exchange until it is successful, a predetermined number of attempts have failed, or the period of time allocated to the major link exchange has expired, whatever occurs first. A similar procedure is also employed by the fox process control computer 12b.

From the above, it should be appreciated that the possibility could arise where the dog process control computer 12a determines that the link was successful, but the fox process control computer 12b makes a determination that the link was unsuccessful. In such a case, the dog will transmit the next link job number, while the fox will transmit the last link job number. Due to the speed at which the major link exchange is performed, the comparisons between the link job numbers is preferably performed after the data has been exchanged. Accordingly, the dog process control computer 12a will not detect that the fox sent a berth of data from the previous exchange until it has sent the next berth of data. In response to the mis-match of link job numbers, the dog process control computer 12a could repeat the major link exchange with the previous link job number, in order that the fox process control computer 12b may have the opportunity of successfully receive this berth of data. Otherwise, the mis-match will continue for the remainder of this particular process control cycle.

Figure 6B:
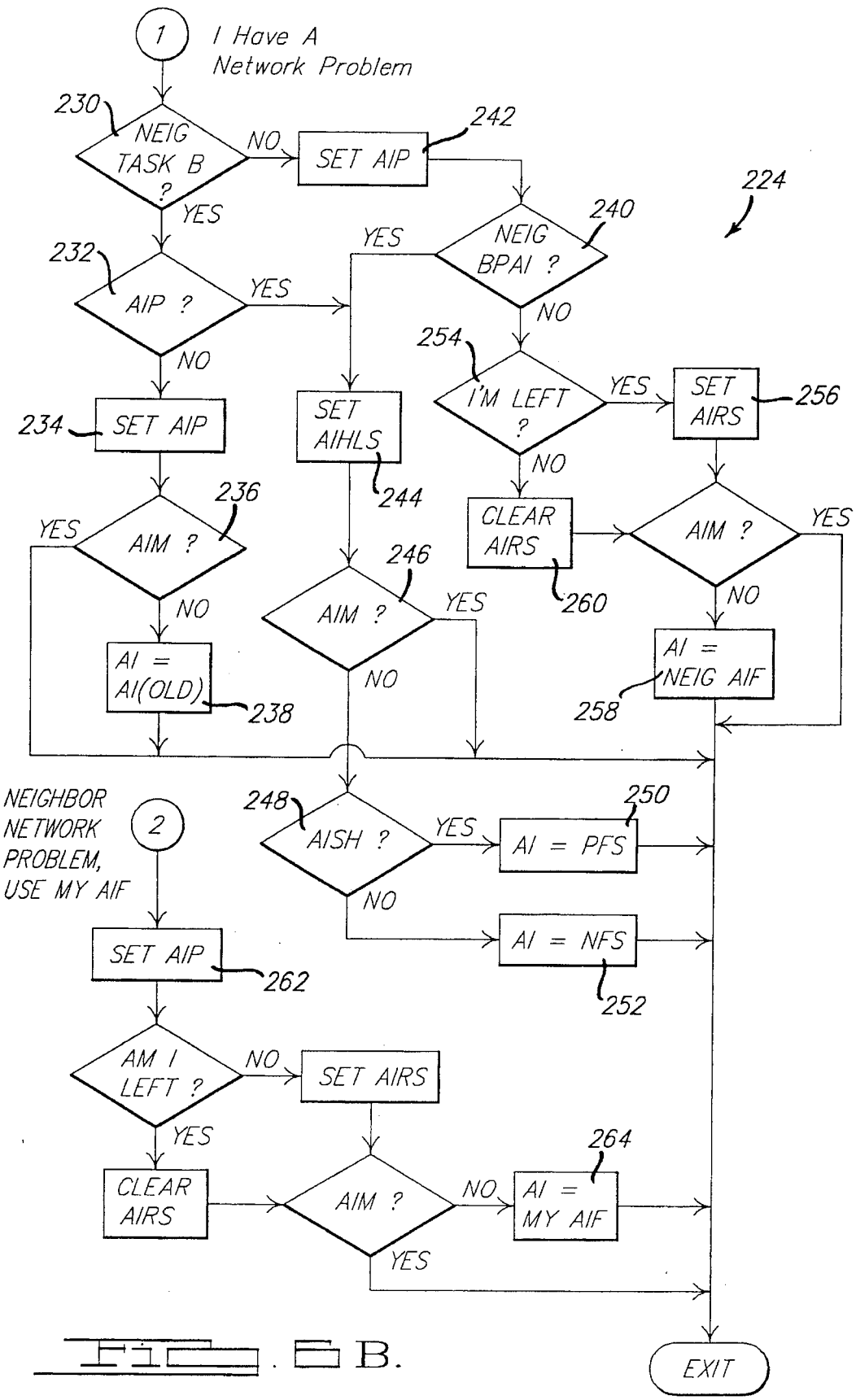

Referring to FIGS. 6A–6C, a set of flow charts is shown to illustrate the analog input signal resolution method 200 according to the present invention when initial arbitration has been performed in a triply redundant remote computer unit 14. It should be noted that the resolution method 200 (as well as all the other resolution methods discussed herein) will be independently performed by both of the process control computers 12a–12b. As indicated by diamond 202, the process control computer 12 will first determine if any analog inputs exist in a remote computer unit 14. In this regard, it should be noted that many of the acronyms or abbreviated terms used in these flow charts, such as "AIRE", refer to a bit which may be set or cleared as required. In the case of the AIRE bit, it will be set (the "true" value) if analog inputs exist in a remote or field computer unit 14. Accordingly, if the AIRE bit is "false" then the resolution method will jump to the local "AI" arbitration method to be described in connection with FIGS. 8A–8H.

Assuming that a remote computer unit 14 is configured to receive and initial arbitrate analog inputs, then the method 200 will proceed to determine if a network communication problem exists for the corresponding AI circuit boards of the remote computer unit, by checking the status of the "BPAI" bit (diamond 204). At this juncture a network communication problem is treated as the equivalent of a board level problem. In this regard, it should be noted that a single AI circuit board in a remote computer unit 14 may receive several different input signals. For example, assuming that an AI circuit board receives ten AI signals, then the method 200 will need to be performed ten times, once for each of these input signals. Additionally, the remote computer unit 14 will preferably notify the process control computer 12 if any problems were found with this particular AI circuit board, when the remote computer unit transmits it input data to the process control computer. The BPAI bit represents one such health and welfare or goodness indicator. Other indicator bits for determining data validity will be discussed below.

Assuming that the BPAI bit was false, then the presence of a board level problem (that is, a network communication problem) for the neighboring process control computer will be checked (diamond 206). In this regard, it should be appreciated that the process control computers 12a–12b will have access to each other's data validity indicator's as a result of the mutual exchange of data across the major link. Assuming that a board level problem was not found in the neighboring process control computer, then a check will be made to determine if the corresponding analog input field values "AIF" are the same (diamond 208). Since initial arbitration should have already been conducted in the remote computer unit, then the AIF value received by the process control computer 12a should be identical to the AIF value received by the process control computer 12b.

Assuming that the corresponding AIF values are identical, then the process control computer (which is conducting the resolution method 200) will clear the analog high/low selection bit "AIHLS" and the analog input right select bit "AIRS" (block 210). As will be apparent from the discussion below, the AIHLS bit is used to cause the process control computer to select either the high or low AIF value (or a positive/negative full scale value) under certain conditions. The AIRS bit is used to indicate that the process control computer has selected the AIF value from either the left process control computer 12a or the right process control computer 12b as the method directs.

Next, the status of the analog input compare "AIC" bit for this input signal will be checked (diamond 212). The AIC bit will be set at the remote computer unit 14 during its arbitration process when the differences between corresponding input signals exceed a predetermined threshold. As will be seen below in connection with the description of FIG. 8E, the AIC bit may also be set at the process control computer 12 for a directly connected AI circuit board. If the AIC bit has been set, then the process control computer 12 will then set the analog input problem "AIP" bit (block 214). The AIP bit is used as a diagnostic aid in order to record that a general problem has occurred with the particular analog input signal being processed through the resolution method 200. The AIP bit may also be set under other conditions, as will be described more fully below. If the AIC bit is false, then the AIP bit will be cleared (block 216).

Next, the status of the analog input manual "AIM" bit will be checked (diamond 218). The AIM bit will be true when an operator of the system 10 causes a particular value for this input signal to be manually set. The ability for an operator to force a particular value for an AI signal is useful, for example, when it is desired to take one of the process control computers 12a–12b temporarily off line. As will be discussed below, the resolution method 200 enables a determination to be made as to whether the AI value selected was derived from the left or right process control computer. Thus, if the right process control computer 12b is to be taken off line, and one or more AI values from this computer have been selected, then an operator may be able to manually cause the left process control computer 12a to use these known values. If the AIM bit has not been set by an operator (e.g., at operator workstation 52 or a control panel at the process control computer), then the final AI value selected for this input signal will be the AIF value of this process control computer (block 220). Otherwise, the resolution method 200 for this input signal will be terminated, as a particular AI value has been manually set by an operator.

In the event that a board level problem was detected for this process control computer at diamond 204, then the AIHLS bit will be cleared (block 222). Nevertheless, the AIHLS bit may be set later, as required. Then, the method 200 will jump to the "My Network Problem Routine" 224, as shown in FIG. 6B. Similarly, if a board level problem was detected at the neighboring process control computer, then the AIHLS bit will be cleared (block 226), and the method will jump to a different location in the routine 224. If no board level problems were encountered, yet the corresponding AIF values do not agree (diamond 208), then the method 200 will jump to the "AI's Diff but no Network Problems" routine 228, as shown in FIG. 6C.

Referring to FIG. 6B, the network problem routine 224 begins by checking to see if the neighboring process control computer is in the "Task B" mode (diamond 230). Task B is a mode in which a process control computer performs all of its normal functions, except that it's decisions are not used. This mode is used, for example, to evaluate a new process control program before bringing the neighboring process control computer back on line (i.e., actively controlling the physical process). In other words, the neighboring process control computer will conduct the input signal arbitration method herein and make output signal decisions, but these decisions will not be used. Accordingly, if the neighboring process control computer is in Task B, then this process control computer may not use the corresponding AI value from its neighbor.

Assuming that the neighboring process control computer is in Task B, then a check will be made to determine if the AIP bit for this input signal was set in the last process control cycle (diamond 232). If this AIP bit was not set, the process control computer will know that a problem was not detected in the last process control cycle (e.g., in the last second). Accordingly, the process control computer 12 will employ the following fault tolerant response. The AIP bit will first be set, so that an indication of a problem in the present process control cycle will be available in the next process control cycle (block 234). Then, a check will be made to determine if an AI value has been manually selected for this input signal (diamond 236). If a manually selected value has been employed, then the routine 224 will be terminated, and the process control computer will proceed to resolve the next analog input signal. Otherwise, the AI value selected (and stored) from the last process control cycle "AI(OLD)" will be used for this process control cycle (block 238). Thus, it should be appreciated that the method according to the present invention provides for a fault tolerant response which will revert to the last valid AI value for a limited period of time (e.g., one process control cycle).

If the AIP bit was set from the last process control cycle (diamond 232), then the process control computer will know that a problem relative to this input signal was detected during the last process control cycle. In this situation, neither AIF value will be used to select the final AI value. This is also true when the neighboring process control computer is not in the Task B mode, but a board level problem was detected for this neighbor (diamond 240). It should also be noted that the AIP bit is set when the neighboring process control computer is not in the Task B mode (block 242), in order to permit the process control computer to remember that a problem was detected relative to this input signal for use in the next process control cycle.

When the answer to either diamond 232 or diamond 240 is Yes, then the AIHLS bit will be set (block 244). When the AIHLS bit is set (i.e., true), then the high/low selection procedure will be invoked, assuming that the AIM bit has not also been set (diamond 246). In this regard, the status of the analog input select high "AISH" bit will be checked (diamond 248). If the AISH bit is true, then the positive full scale "PFS" value of the input signal will be selected as the final AI value (block 250). Otherwise, the negative full scale "NFS" value of this input signal will be selected as the final AI value (block 252). In this regard, it should be appreciated that the NFS value for some input signals will be zero, while the NFS value for other input signals will have a predetermined negative value.

In the event that the BPAI bit was false (diamond 240), then a determination will be made as to whether this process control computer is the left process control computer 12a or the right process control computer 12b (diamond 254). If this process control computer is the left process control computer 12a, then the analog input right select "AIRS" bit will be set (block 256). The status of this bit will provide an indication to the system 10 and/or to the operator as to whether the final AI value for this input signal was derived from the left or right process control computer. In this particular case, the "true" state of the AIRS bit will indicate that the final AI value was selected from the neighboring/right process control computer 12b (block 258). With this information recorded, the operator will be able to make an informed decision as to what the AI value should manually to set to if the right process control computer 12b is to be taken off line. If the answer to diamond 254 determined that this process control computer was the right process control computer 12b, then AIRS bit will be cleared (block 260) in order to indicate that the final AI value was selected from the left process control computer 12a.

As shown by entry point "2", the AIP bit will be set (block 262) when the neighboring process control computer has encountered a board level problem. In such a situation, the procedure set forth above will be used to determine whether this is the left or right process control computer, and then the final AI value will be selected from this process control computer (block 264).

Turning to FIG. 6C, the routine 228 will be implemented when no board level problems were encountered, yet the AIF values are different. In this case, it is unclear as to which of the two AIF values may be correct. Accordingly, the AIC, AIP and AIHLS bits will be set for this input signal (block 266). The AIC bit will be set at the process control computer, because a comparison difference has been detected. Additionally, the AIP bit will be set to record the presence of a problem in this process control cycle. The AIHLS bit will also be set in order to provide a high/low selection criteria as between the two AIF values.

Next, the status of the AISH bit will be checked (diamond 268). Assuming that the AISH bit is true, then a determination will be made as to whether the AIF value of this process control computer is higher or lower than the AIF value of the neighboring process control computer (diamond 270). If the answer is yes, then the final AI value will be my AIF value (block 272), and the AIRS bit will be set or cleared as required (diamond 274 and blocks 276–278). If the AISH bit is false, then a determination is made as to whether the neighboring process control computer is in the Task B mode (diamond 280). If the neighboring process control computer is in the Task B mode, then my AIF value will be selected, even though it was not the higher of the two AIF values. If the neighboring process control computer is not in the Task B mode, then it's AIF value will be selected (block 282), and the AIRS bit will be set or cleared as required (diamond 284 and blocks 286–288).

In the event that the AISH bit was false (diamond 268), then a comparison will be made to determine which of the two AIF values were the lowest (diamond 290). Then, the process control computer will respond accordingly as discussed above. It should also be noted that the appropriate checks will also be made to determine if the final AI value has been manually selected (diamonds 292–296).

Figure 7A:
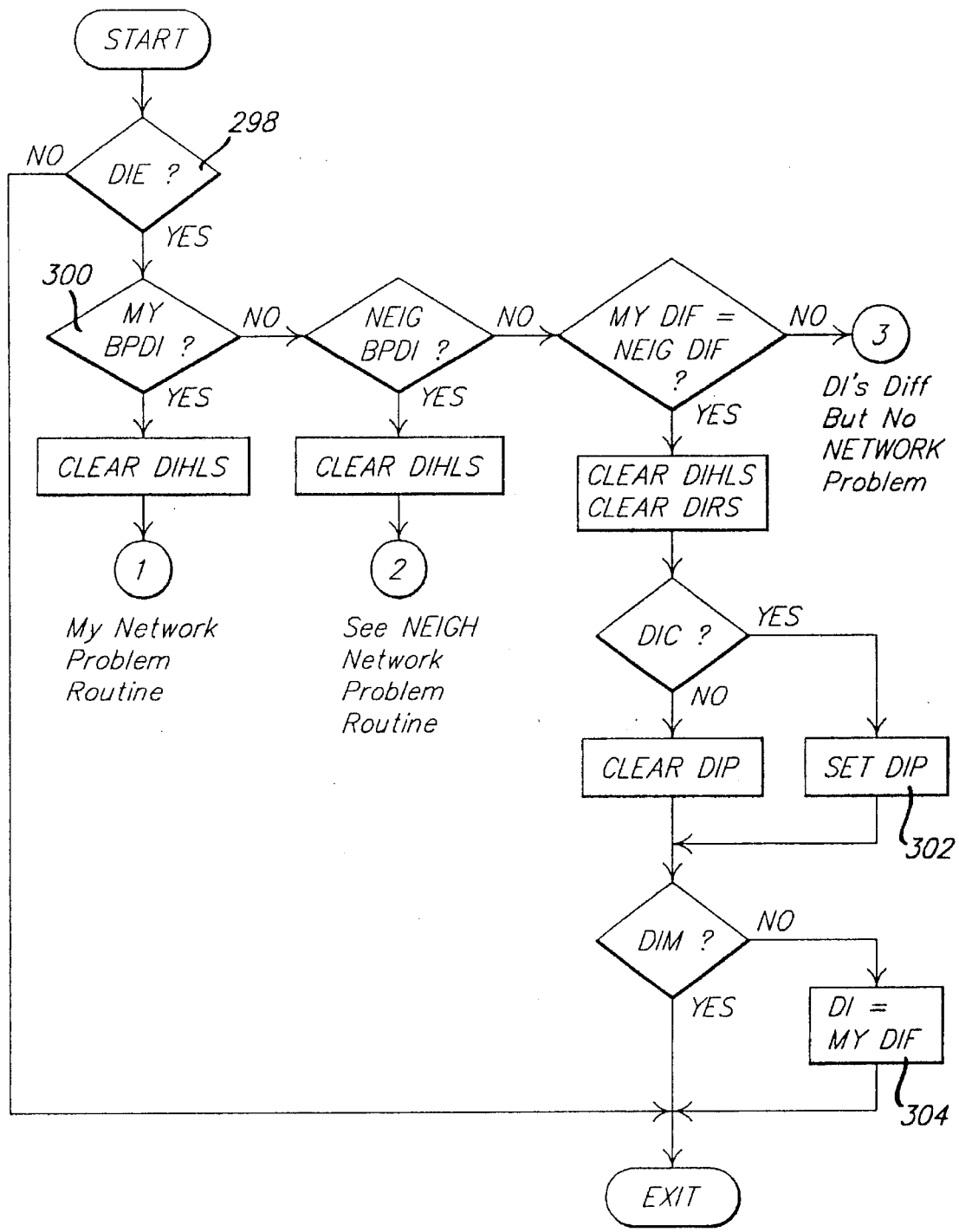
FIGS. 7A, 7B and 7C provide a set of flow charts which illustrate the digital input signal resolution method according to the present invention when initial arbitration has been performed in a triply redundant remote computer unit.
Figure 7B:
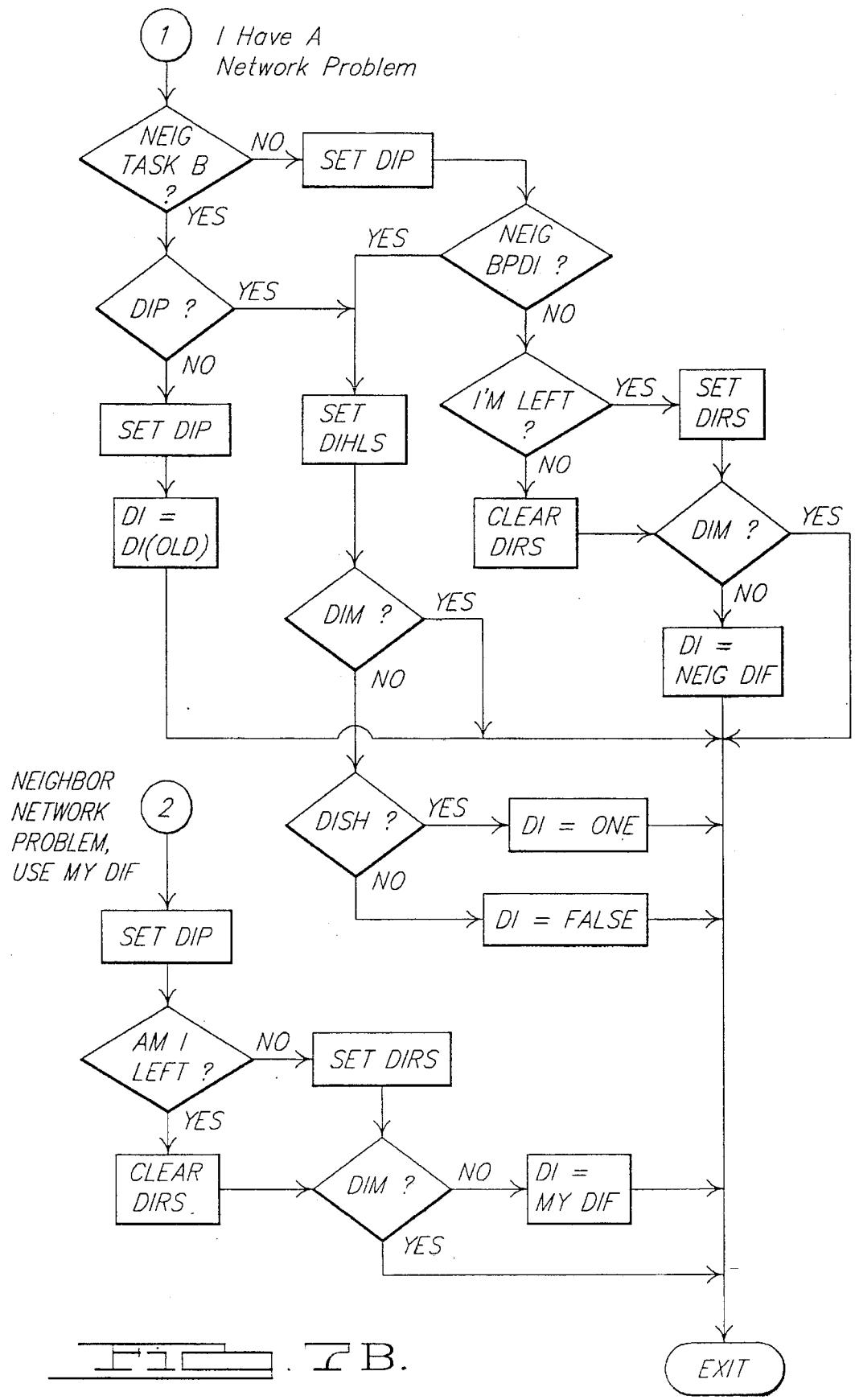
Figure 7C:
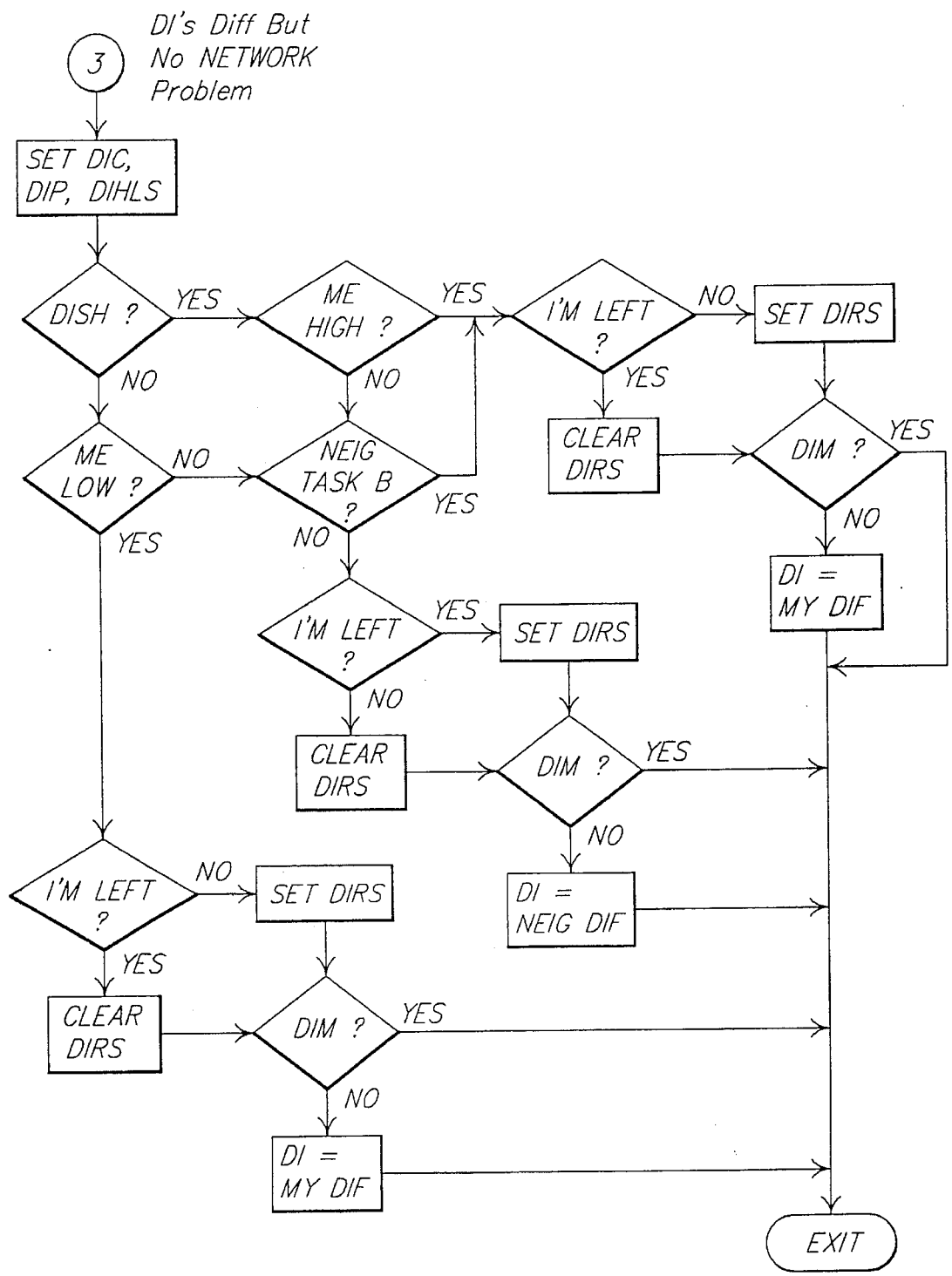
Figure 5A:
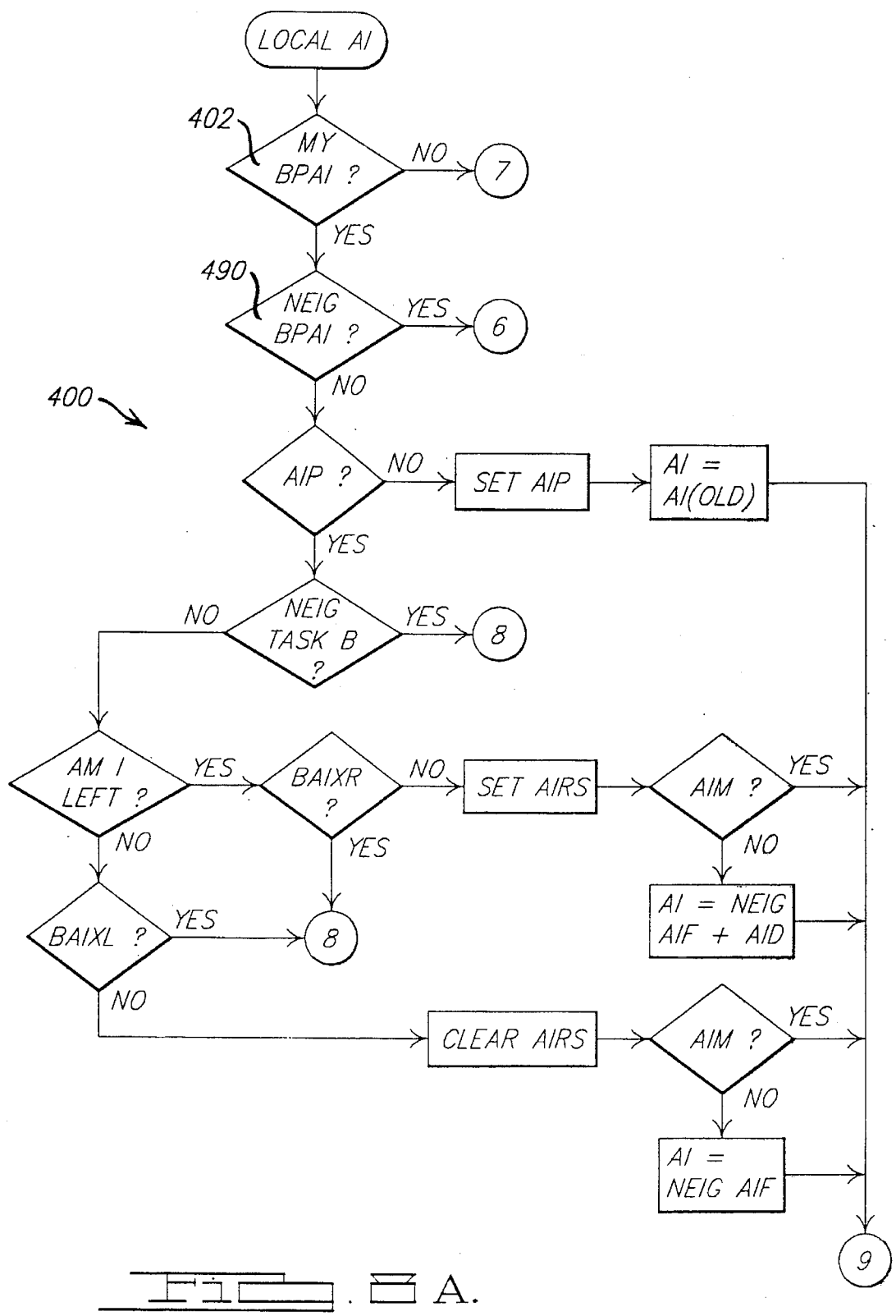

Referring to FIGS. 7A–7C, a set of flow charts is shown to illustrate the digital input signal resolution method according to the present invention when initial arbitration has been performed in a triply redundant remote computer unit 14. In this regard, it should be appreciated that the method set forth in FIG. 7A for digital input signals generally follows that set forth in FIG. 6A for analog input signals. Similarly, the method set forth in FIG. 7B generally follows that set forth in FIG. 6B, and the method set forth in FIG. 7C generally follows that set forth in FIG. 6C. However, the letter "A" has been replaced by the letter "D". Thus, for example, the "DIE" bit is used to determine if a digital input signal exists (diamond 298). Similarly, the BPDI bit is used to determine if a board level problem is present in the digital input circuit board (diamond 300), the DIP bit is used to determine the presence of a general digital input problem for this digital input signal (block 302), and the DIF term refers to the digital input field value (block 304). However, whereas an AIF value may vary anywhere between its positive and negative full scale values, it should be understood that the DIF value will be either high/one/true or low/zero/false. While not shown in FIG. 7A, it should also be noted that a check is made following diamond 298 to determine if any of the existing digital inputs are derived from a remote computer unit 14. If the answer is yes, then the method proceeds to diamond 300. However, if the answer is no, then the method will jump to the local digital input resolution method shown in FIGS. 9A–9E.

Referring to FIGS. 8A–8H, a set of flow charts is shown to illustrate the analog input signal resolution method 400 according to the present invention when initial arbitration has not already been performed. In this regard, the method 400 may be referred to as the "local" resolution method, as this method is used when the analog input signal originates from an analog input circuit board that is directly connected to the process control computer 12. In this regard, it should be remembered that a process control computer 12 may derive it's input signal from directly connected input circuit boards, as well as from a remote computer unit 14. When analog input signals are received from both of these sources, then it should be appreciated that both of the resolution methods 200 and 400 will be implemented for their respective input signals.

Figure 8C:
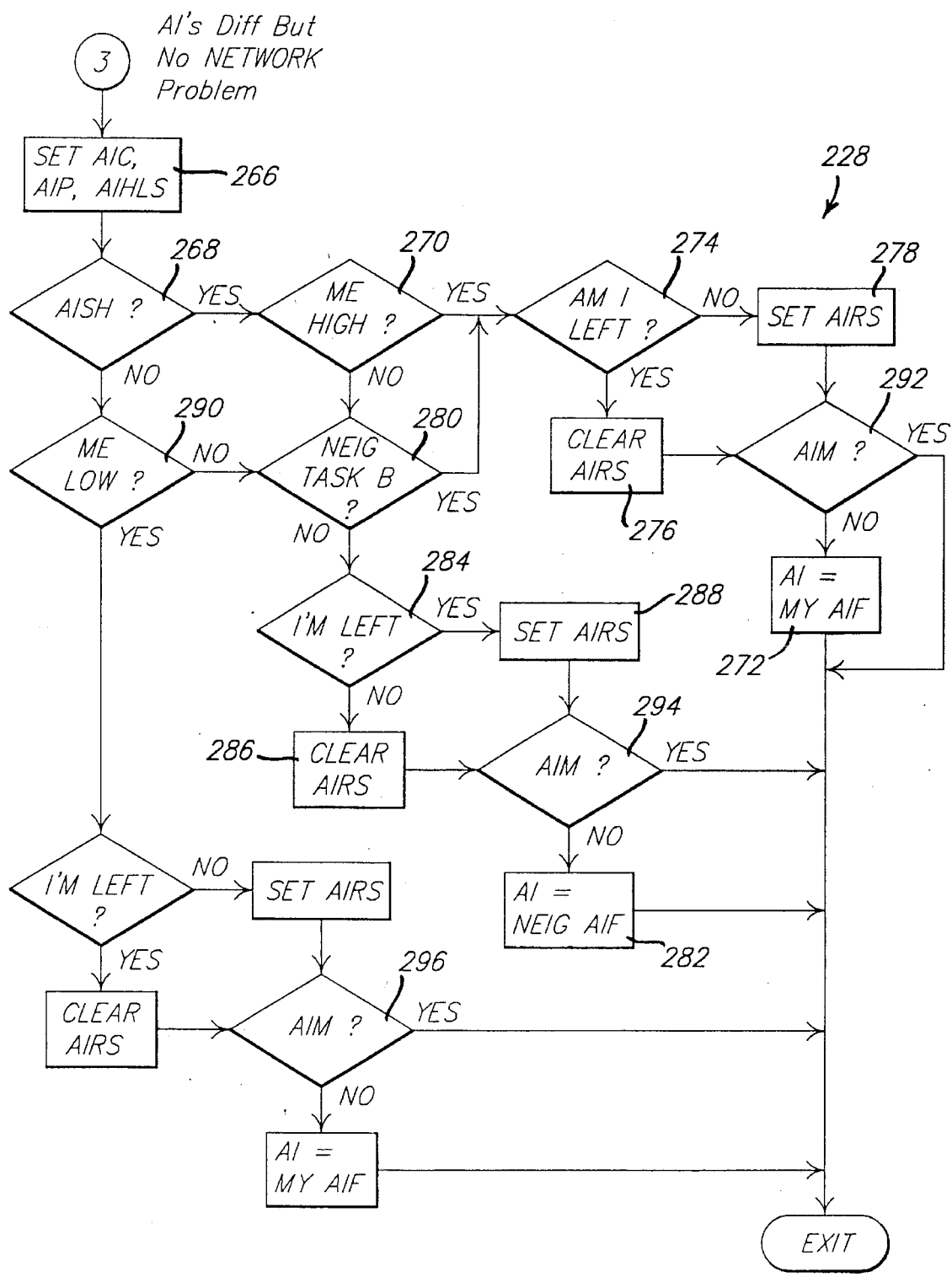
Figure 8B:
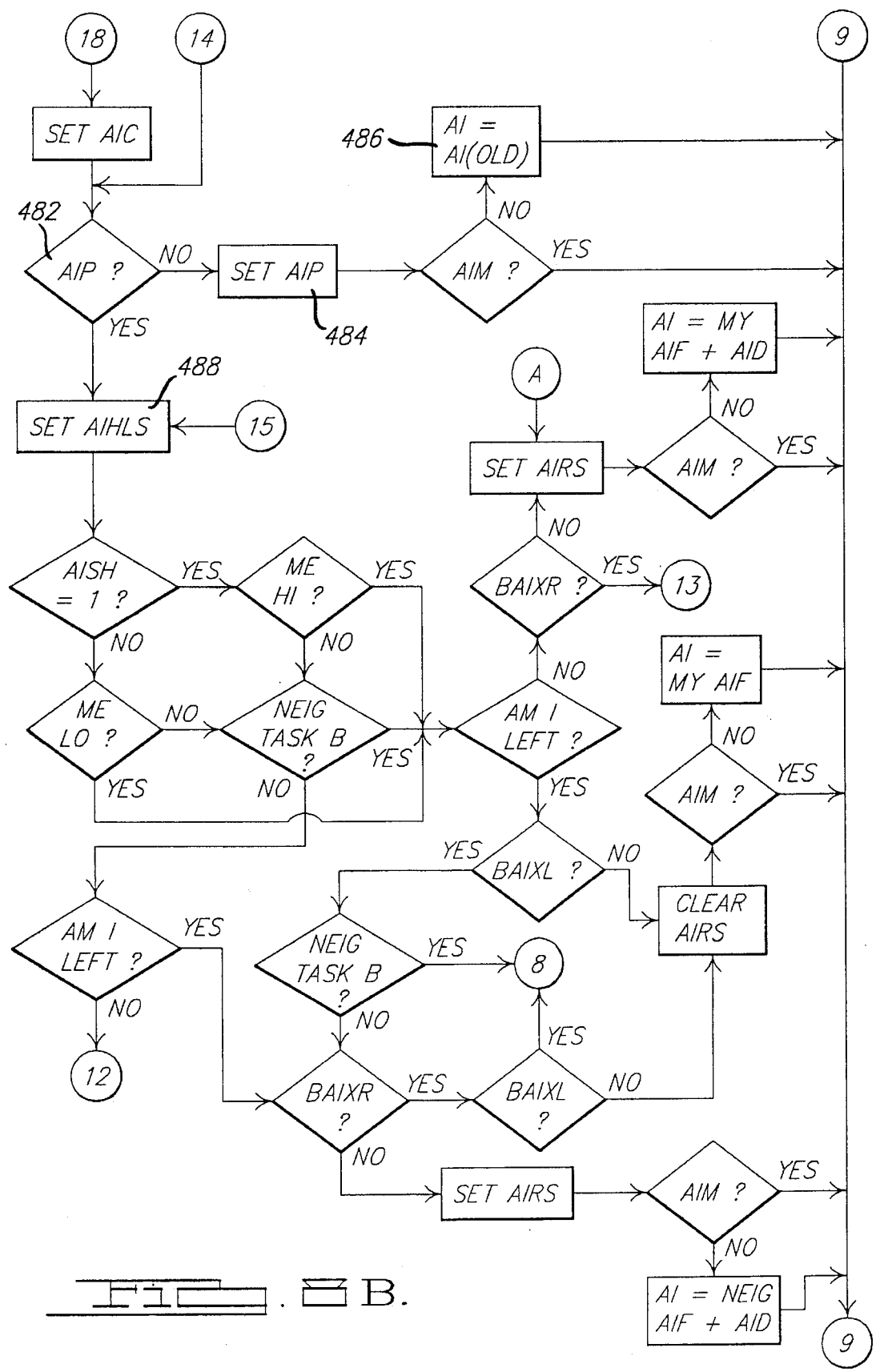
Figure 8C:
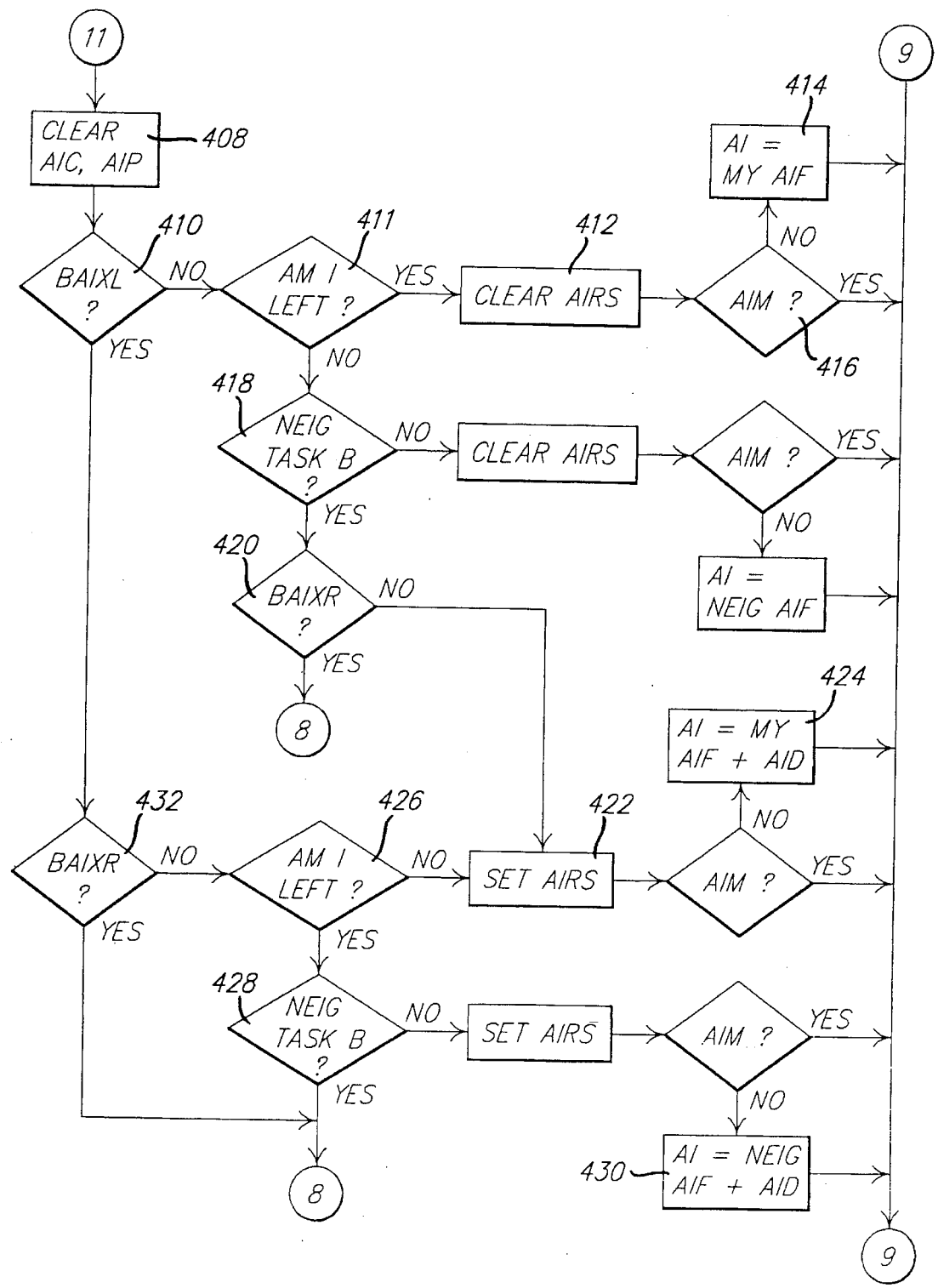
Figure 8D:
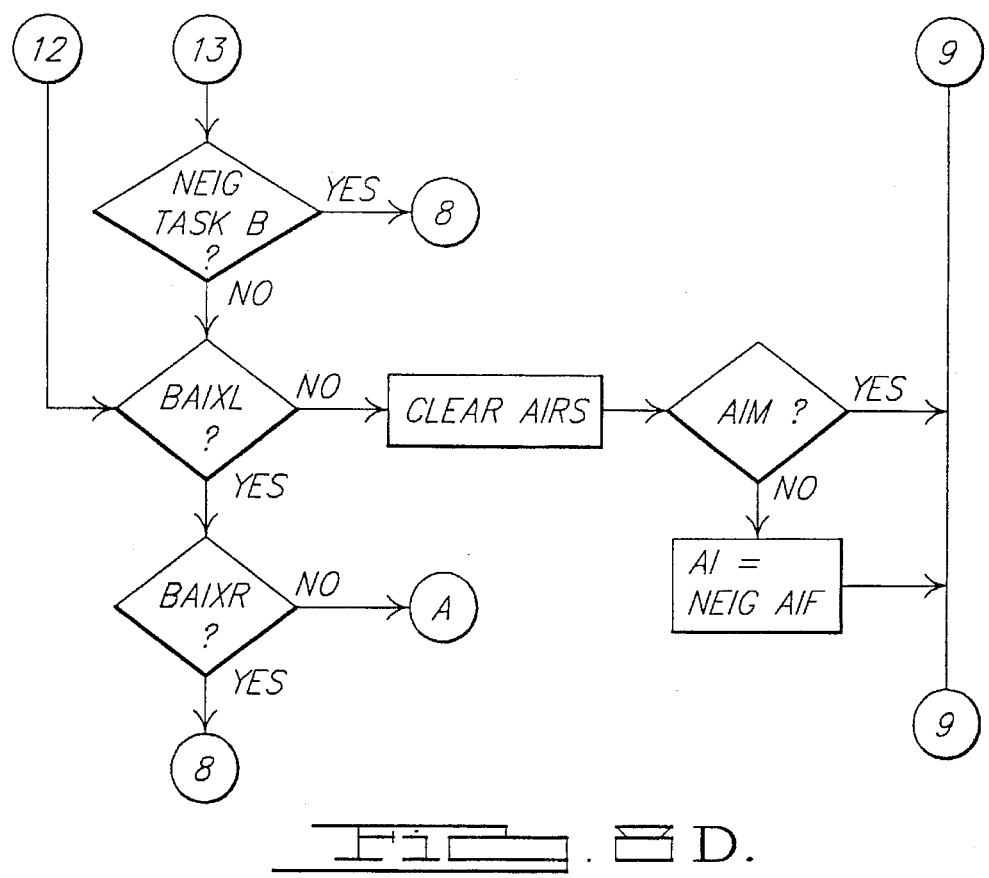
Figure 8G:
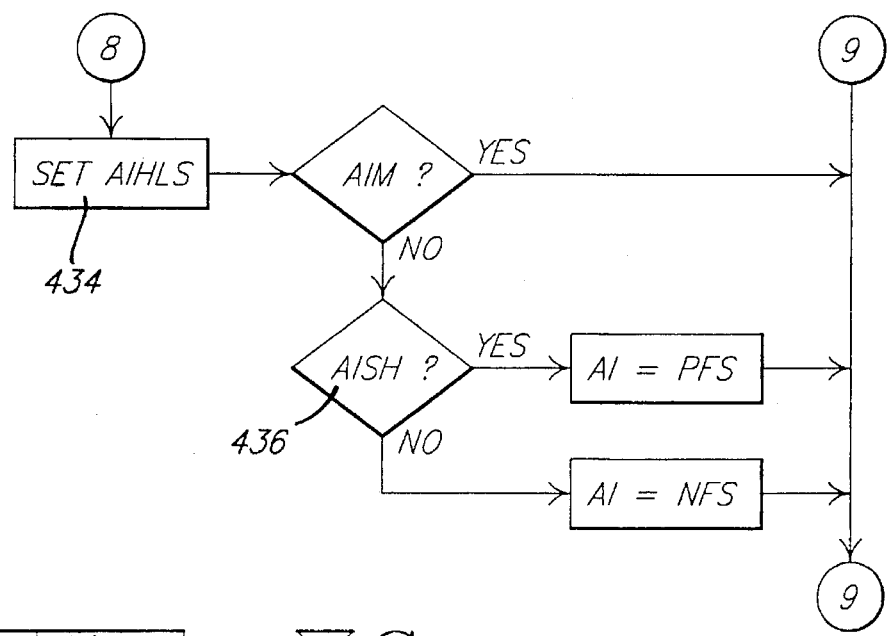
Figure 8E:
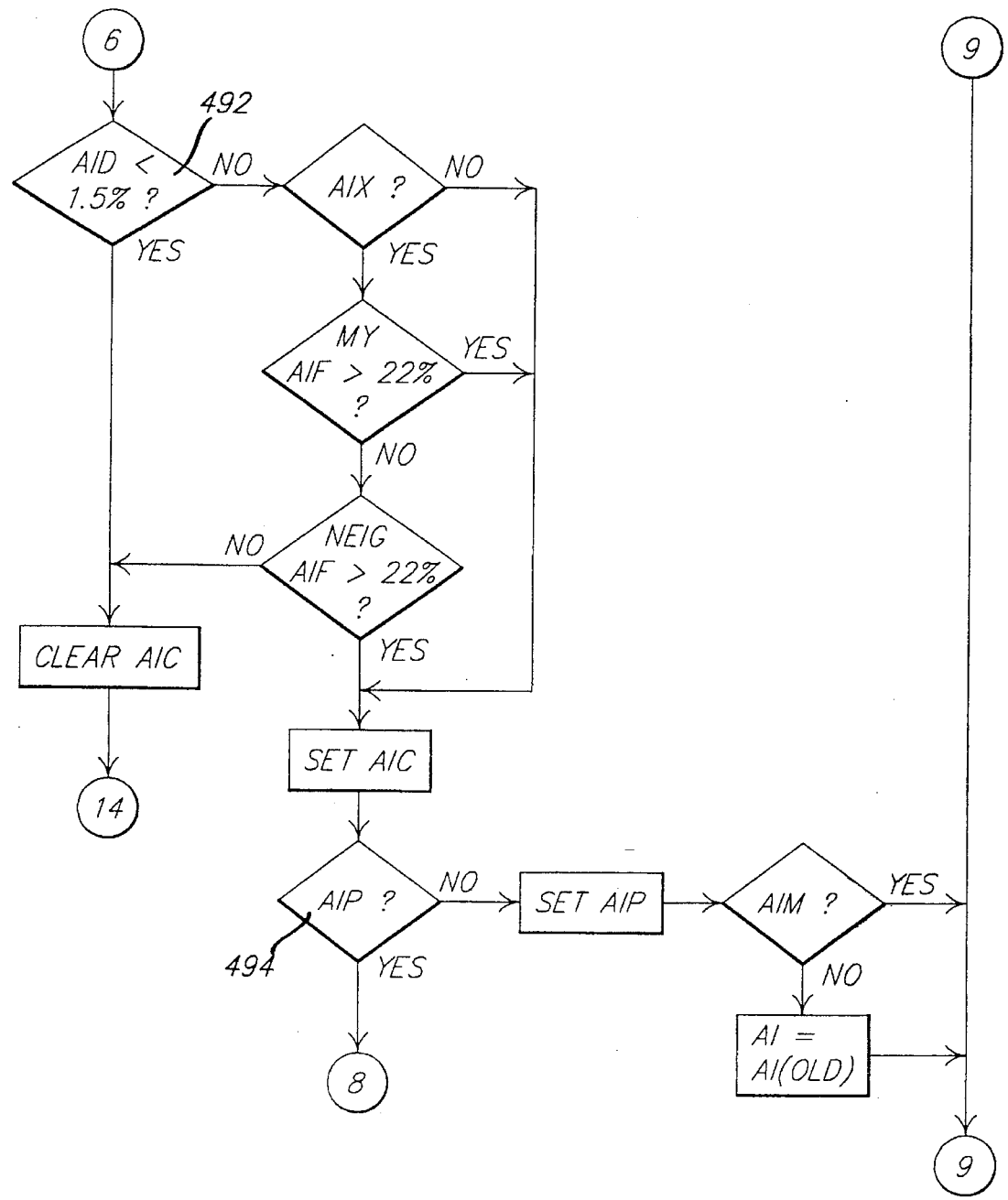
Figure 8F:
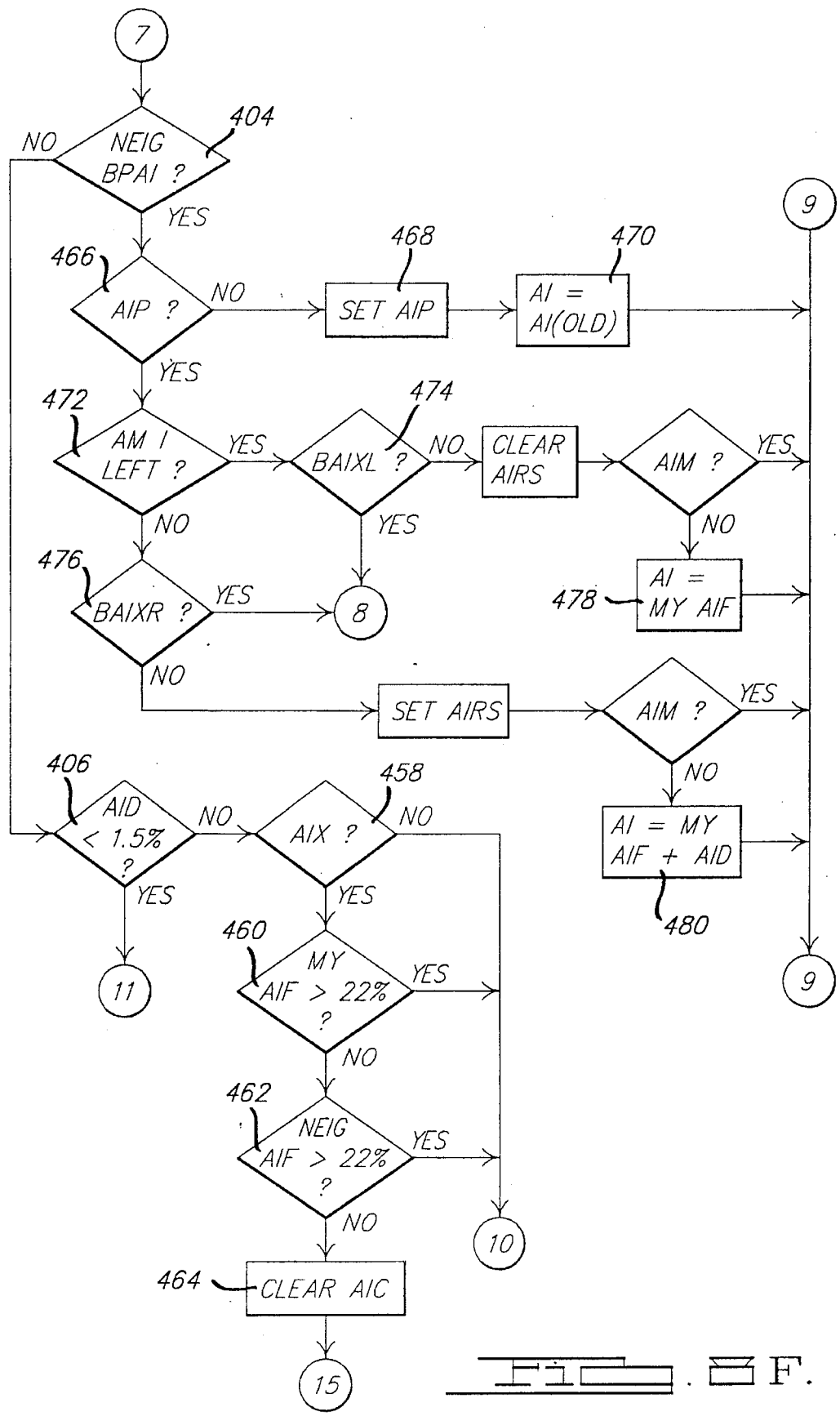

When the BPAI bit is false (diamond 402), the method will jump to the procedure set forth in FIG. 8F. Assuming that a board level problem (that is, a network communication problem) is not detected by the neighboring process control computer (diamond 404), then the magnitudes of the two AIF values will be compared to determine if the difference between them exceeds a predetermined threshold or tolerance (diamond 406). In this particular embodiment, a threshold level of 1.5% of full scale is employed. However, it should be appreciated that other suitable threshold levels may be employed in the appropriate application. If this threshold has not been exceeded, then the method 400 will jump to the procedure set forth in FIG. 8C.

As shown in FIG. 8C, the AIC and AIP bits will be cleared (block 408), as no problems were detected as to this input signal. However, a check will then be made of the BAIXL bit (diamond 410). The BAIXL bit is set when the left analog input board is designated as being out of service. While the left analog input circuit board may be operational, the setting of the BAIXL bit may be used to indicate that service is required. Assuming that the left analog input circuit board is currently in service, a selection criteria is nevertheless employed as between the two AIF values, even though they are within 1.5% of full scale of each other. In this embodiment, the selection criteria will employ the left AIF value (diamond 411). Accordingly, if this process control computer is the left process control computer 12a, then the AIRS bit will be cleared (block 412) and it's AIF value selected for the final AI value (block 414), unless a manual override has been invoked (diamond 416). Similarly, if this process control computer is the right process control computer 12b, then the AIF value from the neighboring (i.e., left) process control computer will be used (block 414), unless it is in the Task B mode (diamond 418).

If the neighboring process control computer is in the Task B mode, then the status of the BAIXR bit will be checked to determine if the neighboring/right analog input circuit is out of service (diamond 420). If the BAIXR bit is false, then the AIRS bit will be set to indicated that the right AIF value will be selected (block 422). However, as indicated by block 424, the final AI value will be the arithmetic summation of the right AIF value and the (+/−) AID value. In this regard, the AID value is a function of the difference between the left AIF value and the right AIF value during the most recent process control cycles. This summation of the value selected and the difference value is used to avoid a process bump in the event that the left AIF value was used in the last process control cycle, and the right AIF value has been selected for the present process control cycle. This same procedure is also employed when the left analog input circuit board is out of service (diamond 410), and this process control computer is the left process control computer 12a (diamond 426). Assuming that the neighboring-right process control computer 12b is not in the Task B mode (diamond 428), then the final AI value will be the summation of the neighboring-right AIF value and the AID value (block 430).

If the answer to any of the diamonds 420, 428 or 432 is affirmative, then the method will proceed to point "8" in FIG. 8G. This is because neither of the left/right AIF values may be considered sufficiently reliable. Accordingly, the AIHLS bit will be set (block 434), and either the positive or negative full scale value will be employed, depending upon the status of the AISH bit (diamond 436). Then, the resolution method 400 will proceed to point "9" in FIG. 8H. It should also be noted that the resolution method 400 will also jump to point "9" of FIG. 8H after executing any of the blocks 414, 416, 424 or 430 shown in FIG. 8C.

Figure 8H:
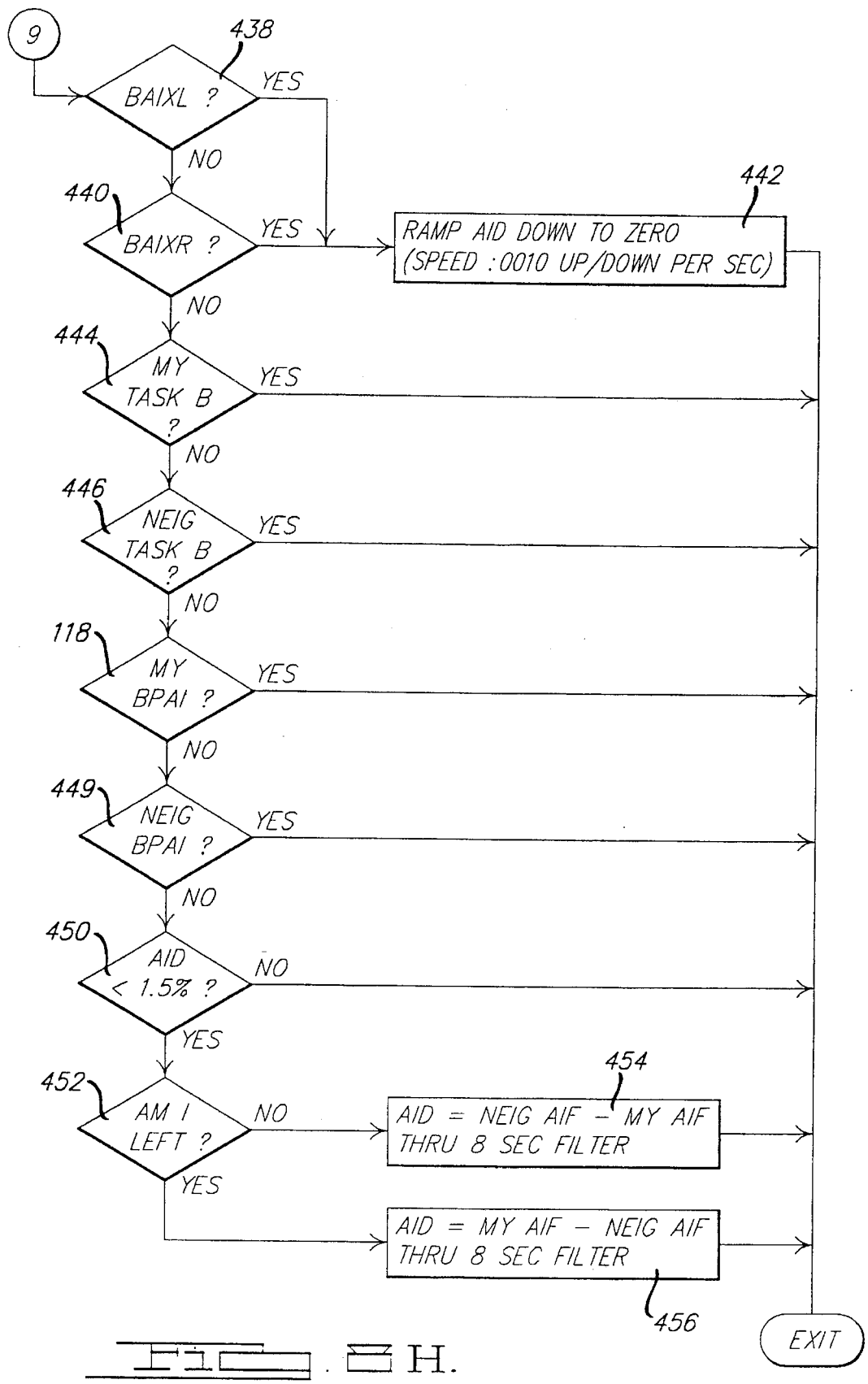
Figure 9A:
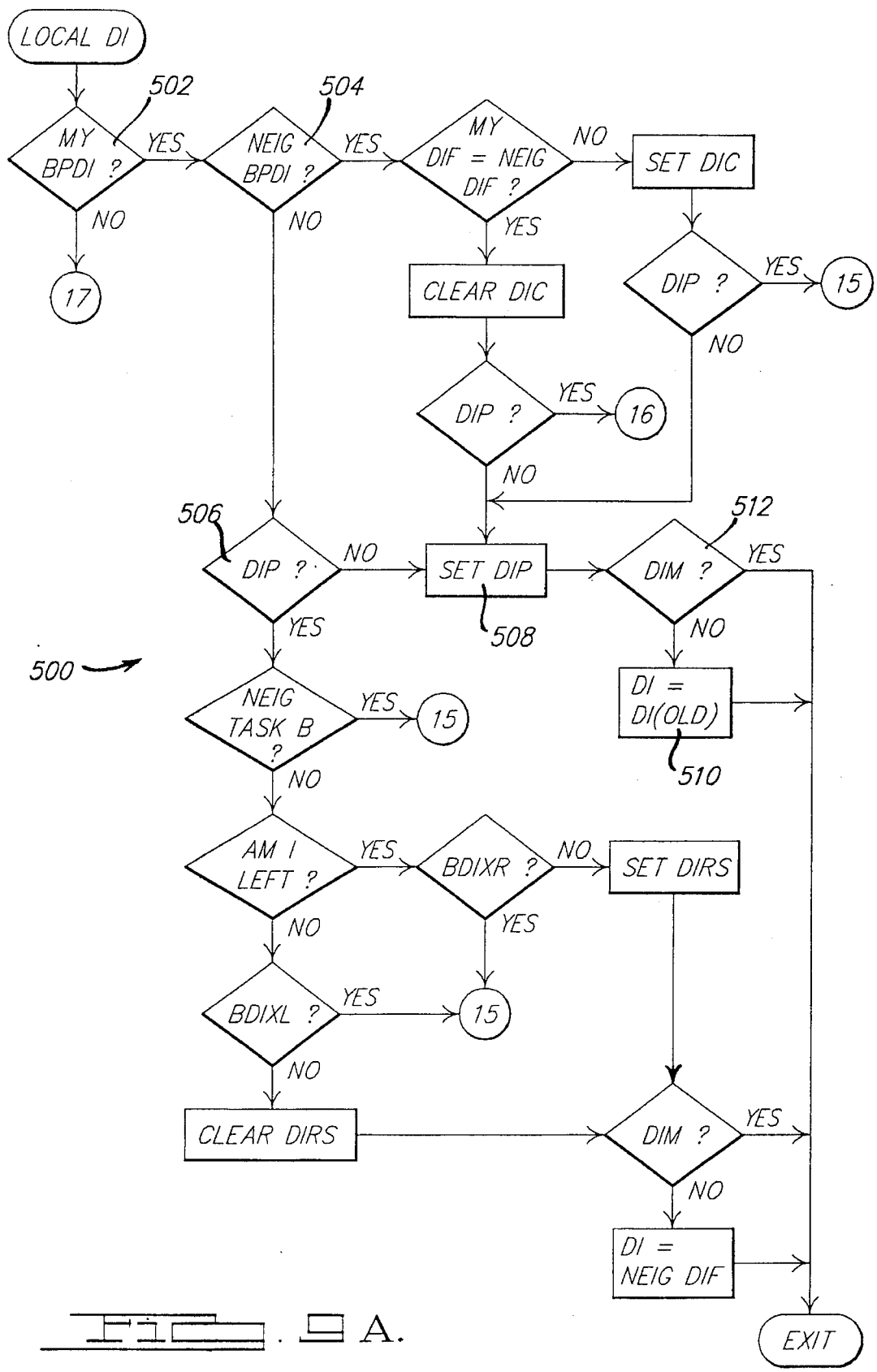
FIGS. 9A, 9B, 9C, 9D and 9E provide a set of flow charts which illustrate the digital input signal resolution method according to the present invention when initial arbitration has not already been performed.
Figure 9B:
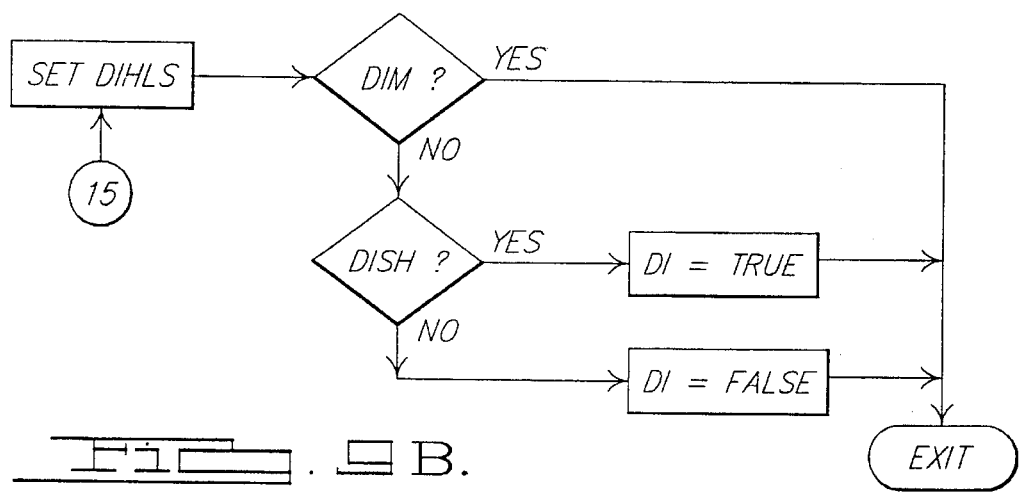
Figure 9C:
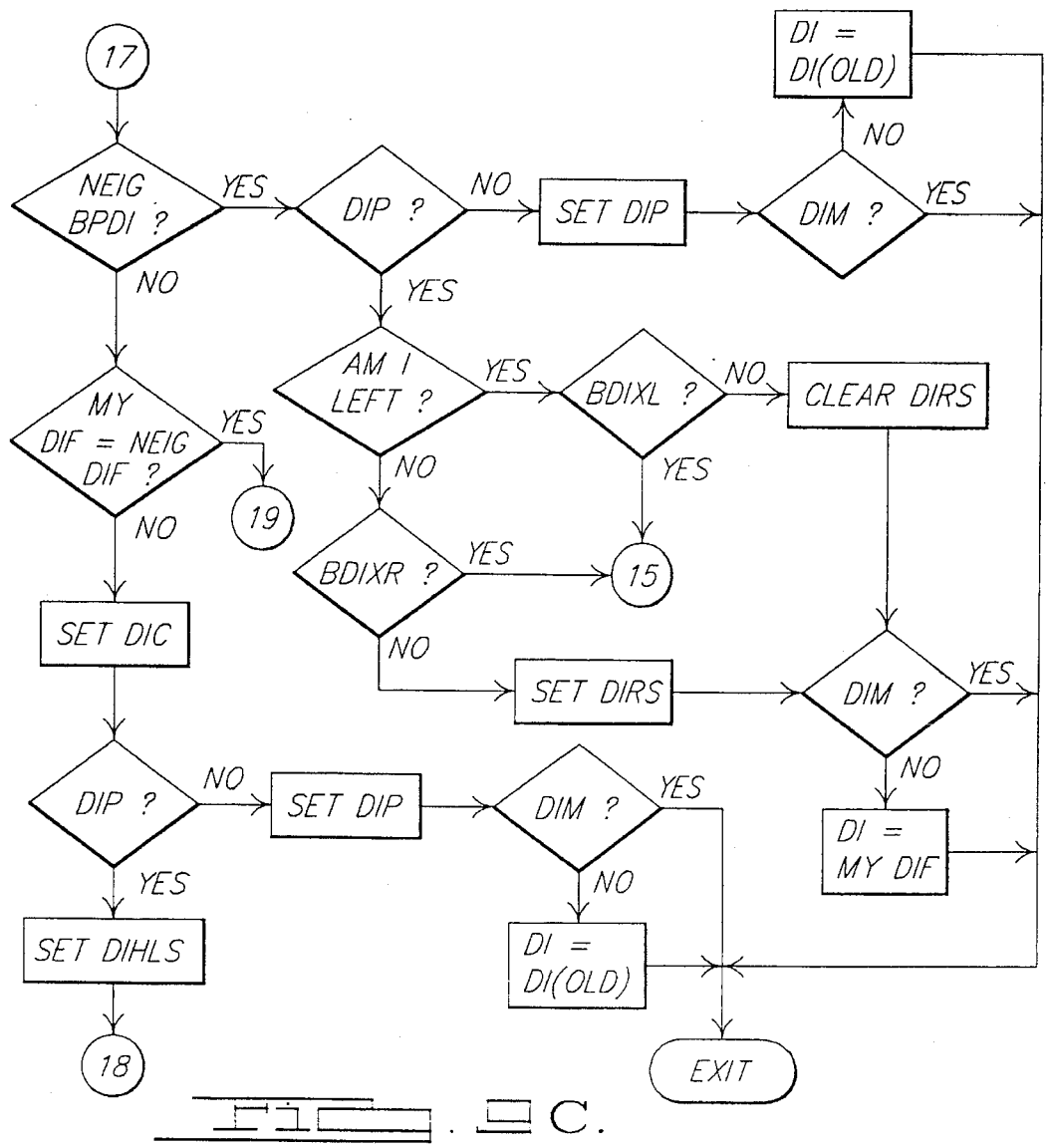
Figure 9D:
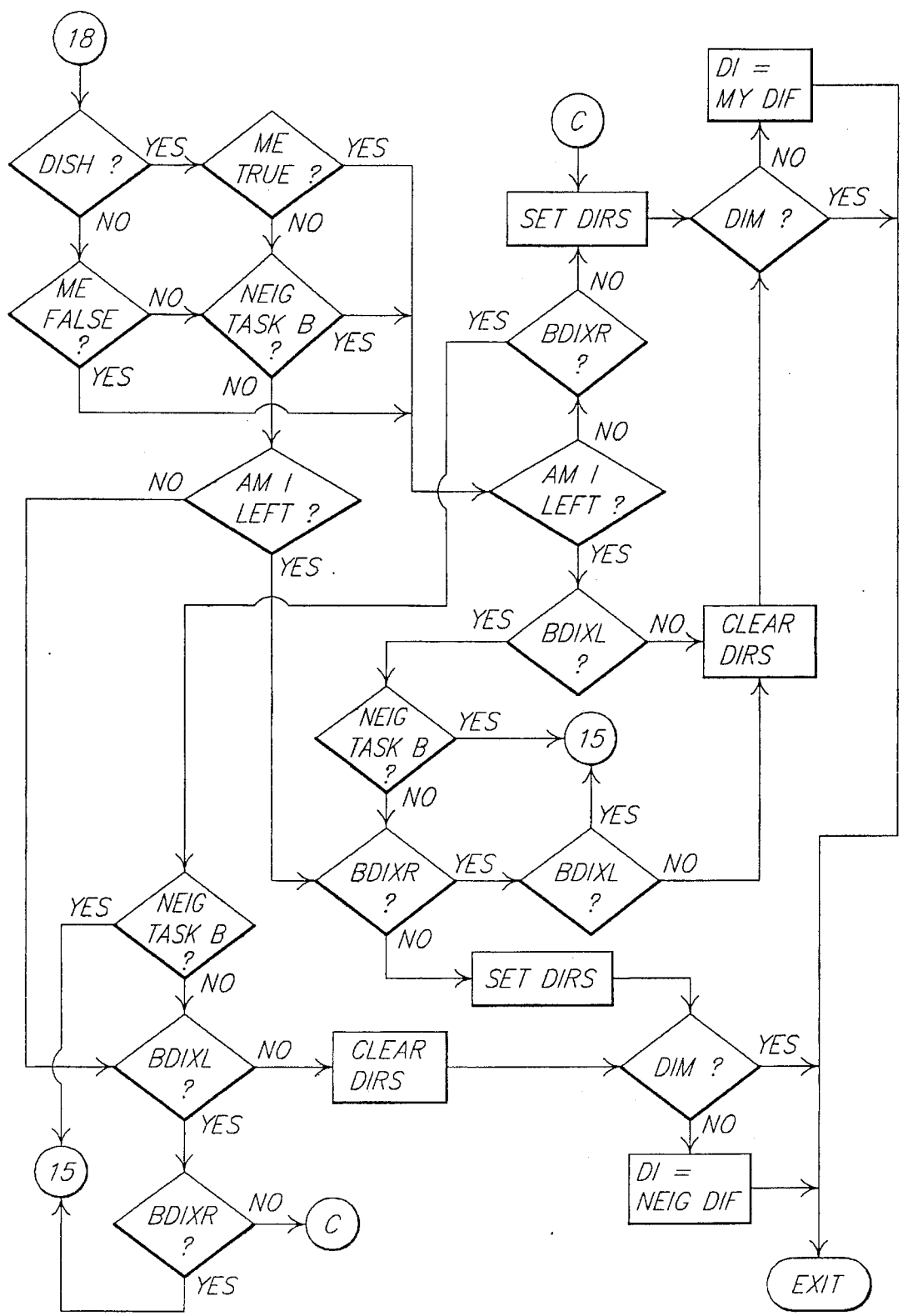
Figure 9E:
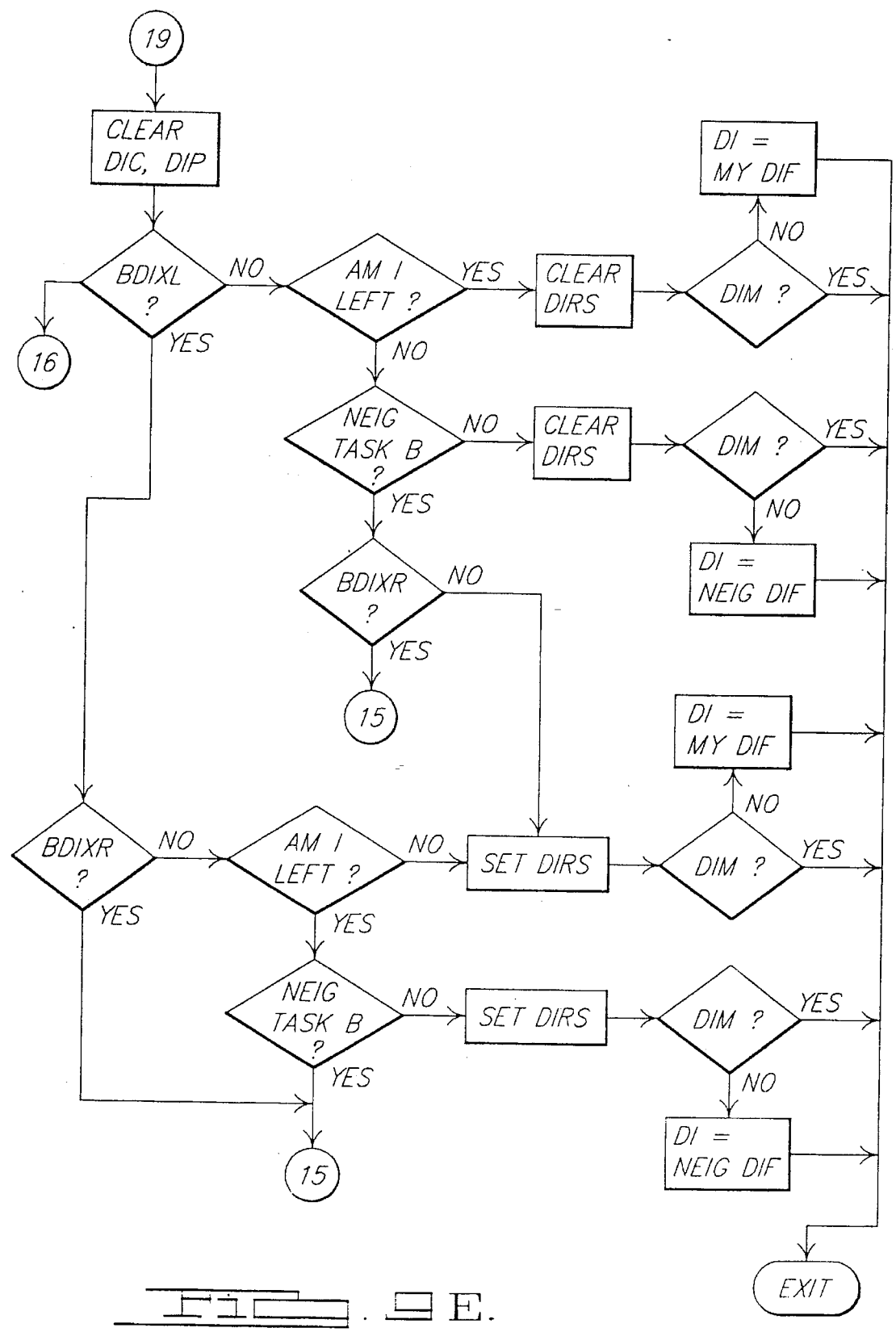

The procedure set forth in FIG. 8H is used to determine the AID value to be used in the next process control cycle. If either of the BAIXL or BAIXR bits are true (diamonds 438 and 440), then the AID value will be ramped down to zero at a predetermined rate (block 442). However, no change in the AID will result if both of the left/right analog input circuits are in service and any of the diamonds 444–448 are answered in the affirmative. Similarly, if the present difference between the two AIF values exceeds the predetermined tolerance (diamond 450), then the AID value will remain the same. However, if the present difference between the two AIF values is below the predetermined tolerance, then an appropriate adjustment will be made (diamond 452 and blocks 454–456). For example, if this process control computer is the left process control computer 12a, then the AID will equal my AIF minus the neighboring AIF through a suitable filter, such as averaging these difference values over the last eight seconds.

Referring again to FIG. 8F, the resolution method 400 will continue to be described from the point where both of the BPAI bits were false (diamonds 402–404), yet the present AID value was found to exceed the predetermined tolerance (diamond 406). In this regard, a check will first be made to determine if this analog input value is an exception to the normal analog input values. In other words, the resolution method 400 accounts for a situation where certain types of input sensors (e.g., orifice plate flow meters) may be more sensitive than other input sensors. If this analog input is an exception, then the AIX bit will be true (diamond 458). Accordingly, as indicated by diamond 460, a value of 22% of full scale may be used as the basis for determining whether the AIC bit should be set or cleared. If neither of the AIF values have exceeded this exceptional level (diamonds 460–462), then the AIC bit will be cleared (block 466), and the resolution method 400 will jump to point "15" in FIG. 8B. Otherwise the resolution method 400 will jump to point "10" in FIG. 8B.

In the event that this process control computer does not have a board level problem, yet the neighboring process control computer does indicate a board level problem (diamond 404 in FIG. 8F), then the status of the AIP bit will be checked (diamond 466). If the AIP bit is false, then this AIP bit will be set (block 468) and the final AI value from the last process control cycle will be employed (block 470). However, if the AIP bit is true, then tests will be performed to determine if this process control computer is the left process control computer 12a (diamond 472), and whether it's AI circuit board is in service (diamonds 474–476). Assuming that it's AI circuit board is in service, then this process control computer's AIF value will be selected if it is the left process control computer (block 478) or it's AIF value will be summed with the AID value if it is the right process control computer (block 480).

Turning now to FIG. 8B, entry points "10" and "15" represent a situation where neither of the process control computers 12a–12b indicate the presence of a board level problem, yet the two AIF values sufficiently different that the accuracy of either value may be questionable. Additionally, as may be seen from an examination of FIGS. 8A and 8E, entry point "14" represents a situation where both of the process control computers 12a–12b detected a board level problem, yet the two corresponding AIF values are within the predetermined tolerance. As indicated by diamond 482 and blocks 484–486, the final AI value from the last process control cycle will be employed when the AIP indicates that a problem was not detected during that process control cycle. If the AIP bit was already set, then the high/low selection criteria will be invoked (block 488). This procedure generally follows that already described in connection with FIG. 8C. However, it should be noted that this procedure continues into FIG. 8D under the conditions represented by entry points "12" and "13".

Referring again to FIG. 8A, it will be seen that the neighboring AI circuit board will be immediately checked for a board level problem (diamond 490) if this process control computer has detected a board level problem for it's own AI circuit board (diamond 402). Assuming that a board level problem is not indicated for the neighboring AI circuit board, then the response will generally follow that as discussed in connection with FIG. 8F, where the answer to diamond 404 is affirmative. In the event that both of the corresponding AI circuit boards have a board level problem, then the resolution method will proceed to entry point "6" in FIG. 8E.

As illustrated by the procedure set forth in FIG. 6E, the response to this fault condition will depend upon the magnitude of the difference between the corresponding AIF values (diamond 492). If the present difference is within the predetermined tolerance, then the high/low selection criteria will be invoked (point "14") if a problem was detected in the preceding process control cycle. However, if this tolerance has been exceeded, then the positive/negative full scale selection procedure will be invoked (point "8"), unless a problem for this analog input was not detected in the preceding process control cycle (diamond 494).

Referring to FIGS. 9A–9E, a set of flow charts is shown to illustrate the digital input signal resolution method 500 according to the present invention when initial arbitration has not already been performed. However, in light of the detailed discussion presented above, such a discussion is not necessary in connection with these flow charts. Thus, for example, where one or both of the directly connected digital input "DI" circuit boards has a board level problem (diamonds 502–504), then the final DI value from the preceding process control cycle will be selected if the DIP bit for this input signal is false (diamond 506 and blocks 508–510). However, as in the preceding cases, this selection will be overridden when a manual selection has been employed (diamond 512).

Figure 10:
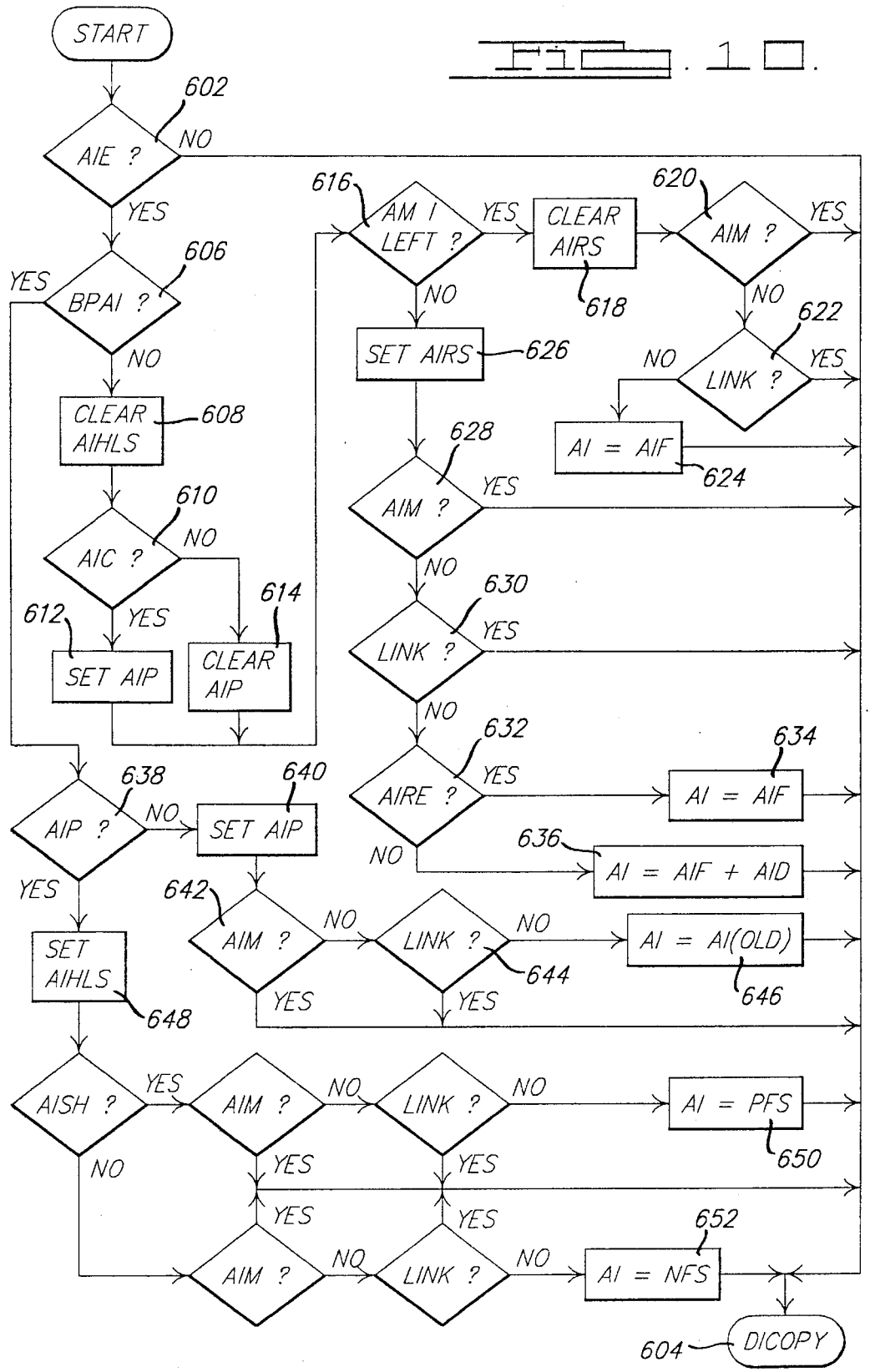
FIG. 10 is a flow chart which illustrates the AI/DI Copy routine shown in FIG. 3.

Referring to FIG. 10, a flow chart is shown which illustrates the AI/DI Copy routine 114 shown in FIG. 3. This routine is designed to provide a resolution method when the major link is not available or the major link method has not been successfully completed. The AI/DI Copy routine 114 will be repeatedly executed until all existing AI and DI values have been processed. Accordingly, it will first be determined if an unresolved analog input exists (diamond 602). If the answer is no, then the method will proceed directly to the DICOPY routine 604 shown in FIG. 11. Otherwise, the existing AI value will be resolved before proceeding to resolving an existing DI value.

If a board level problem has not been detected (diamond 606), then the AIHLS bit will be cleared (block 608) and the AIC bit will be checked (diamond 610). If this compare bit was set in a remote computer unit 14, then the AIP will be set (block 612). Otherwise, the AIP bit will be cleared (block 614). Then, it will be determined whether this process control computer is the left process control computer 12a (diamond 616). If this process control computer is the left process control computer 12a, then the AIRS bit will be cleared (block 618), and a check will be made to see if a manual value has been selected (diamond 620). Assuming a manual override has not been invoked, then a check will be made to determine if the major link exists (diamond 622). In this regard, it should be noted that this test may be performed on the basis of a successful transfer of this block of AI signals, or this test could require that the major link method be successfully completed for all input signals. Assuming that the major link was not available, then the final AI value will be the AIF value for the left process control computer 12a.

If this process control computer is the right process control computer 12b, then the AIRS bit will be set (block 626), the presence of a manual override will be checked (diamond 628) and the availability of the major link will be checked as well (diamond 630). Assuming that the major link was unavailable, then it will be determined if this analog input signal was received from a remote computer unit 14 (diamond 632). If the AIRE bit is true, then the final AI value will be the AIF value received by the right process control computer 12b from its remote computer unit 14 (block 634). However, if this analog input signal was derived from a directly connected analog input circuit board, then the final AI value will be the summation of this AIF value and the AID value (block 636). This summation is employed, because initial arbitration has not already been performed, and it is possible that the AIF value from the left process control computer 12a was selected in the last process control cycle.

In the event that a board level problem was detected (diamond 606), then the AIP bit will be checked to determined if a problem was encountered in the last process control cycle (diamond 638). If a problem was not detected in the last process control cycle, then the AIP bit will be set (block 640), and the manual override and link availability checks will be made (diamonds 642–644). Assuming that the major link was unavailable, then the final AI value will be the final AI value selected from the last process control cycle (block 646). If the AIP bit was already set, then the AIHLS bit will be set (block 648), and the positive/negative full scale selection criteria will be invoked (blocks 650–652).

Figure 11:
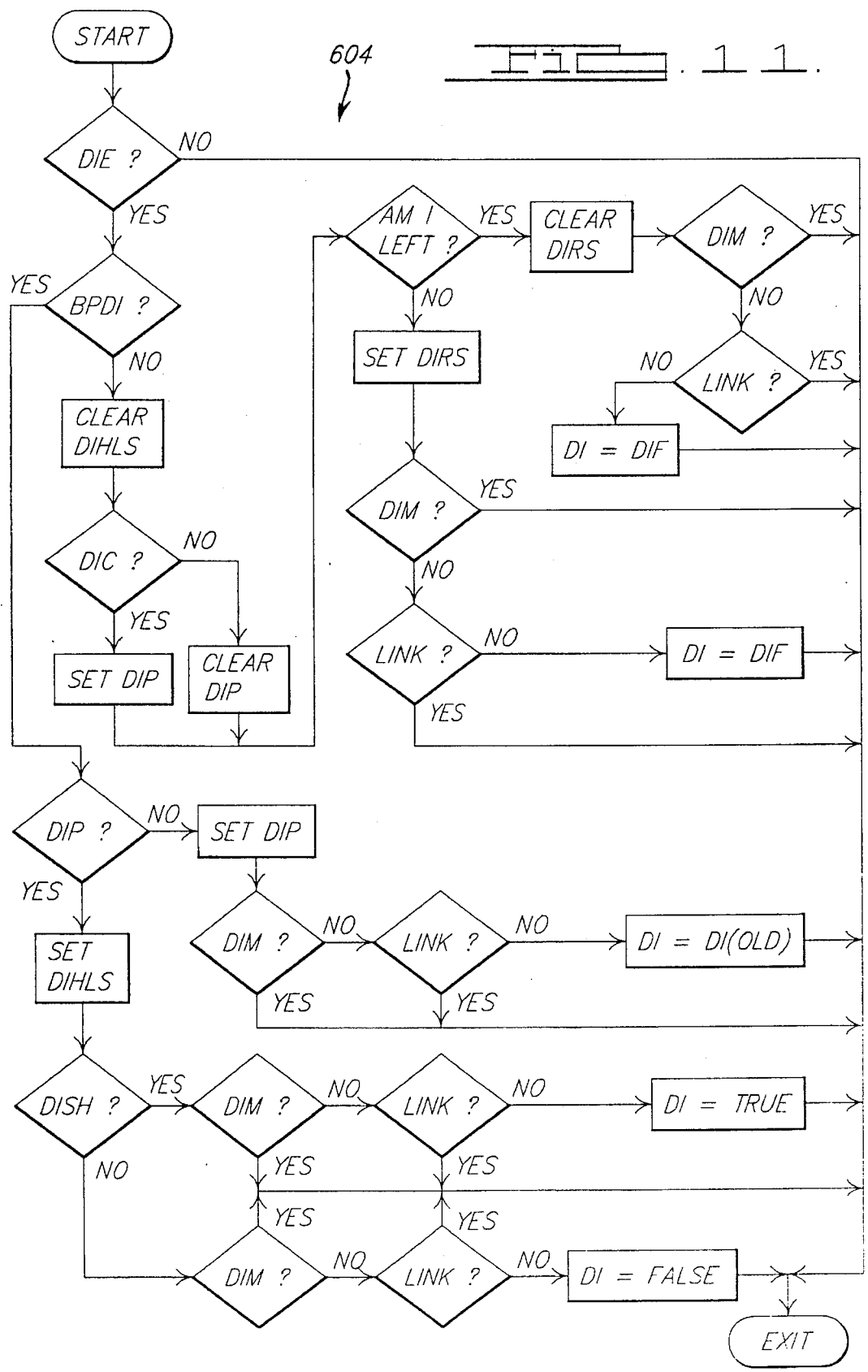
FIG. 11 is a flow chart of the DICOPY routine shown in FIG. 10.

Referring to FIG. 11, a flow chart of the DICOPY routine 604 is shown. In this regard, it will be appreciated that this routine generally follows that described in detail for the AI/DI Copy routine 114 of FIG. 10. However, it should be noted that the testing of the AIM/DIM bits and the testing of the availability of the major link could be made at other locations in these routines. Similarly, the testing of such indicators in other of the foregoing flow charts could also be suitably modified in the appropriate application.

The present invention has been described in an illustrative manner. In this regard, it is evident that those skilled in the art once given the benefit of the foregoing disclosure, may now make modifications to the specific embodiments described herein without departing from the spirit of the present invention. Such modifications are to be considered within the scope of the present invention which is limited solely by the scope and spirit of the appended claims.

What is claimed is:

1. A method of input signal resolution in a process control system having a plurality of actively redundant process control computers, where each of said actively redundant process control computers receives corresponding input signals from the physical process being controlled, comprising the steps of:

mutually exchanging at least one block of said corresponding input signals between each of said actively redundant process control computers, each of said blocks of corresponding input signals including at least one input signal from the physical process being controlled, a first indicator which represents the validity of the at least one input signal contained in said block and a second indicator which characterizes the block of input signals to be exchanged;

performing at least one comparison to each of said actively redundant process control computers using said second indicator to determine the success of said mutual exchange of said block of corresponding input signals;

individually selecting an input valve at each of said actively redundant process control computers for each of said input signs exchanged, said selecting step being responsive at least in part to said first indicator to determine which of said corresponding input values to select; and recording an indication at each of said actively redundant process control computers to identify which of the corresponding input signals were selected by that actively redundant process control computer.

2. The method according to claim 1, wherein there are at least three corresponding input signals, and said step of recording an indication includes at least one indicator bit for each of said corresponding input signals whose value identifies which corresponding input signal was selected.

3. The method according to claim 1, wherein a plurality of blocks of said corresponding input signals are mutually exchanged between each of said actively redundant process control computers.

4. The method according to claim 3, wherein said step of individually selecting an input value is performed for each of said input signals in an exchanged block before another block of said corresponding input signals are exchanged.

5. The method according to claim 1, further including the step of periodically transmitting a clocking signal from one of said actively redundant process control computers to the other of said actively redundant process control computers to coordinate each of said actively redundant process control computers by making periodic phase corrections, such that said mutually exchanging step is performed without interrupting the central processing units of said actively redundant process control computers.

6. The method according to claim 5, wherein said clocking signal is transmitted at a predetermined pseudo time domain rate during each process control cycle of said actively redundant process control computers.

7. A method of input signal resolution in a process control system having a plurality of actively redundant process control computers, where each of said actively redundant process control computers receives corresponding input signals which represent analog values from a physical process being controlled with each process control cycle, comprising the steps of:

mutually exchanging at least one block of said corresponding input signals between each of said actively redundant process control computers;

determining if a predefined tolerance has been exceeded between the analog values of at least some of said corresponding input signals, and if said predefined tolerance was exceeded during the present process control cycle, then determining if said predefined tolerance was also exceeded in at least the last process control cycle;

individually selecting an analog input value at each of said actively redundant process control computers for each of said input signals exchanged where said predefined tolerance was not exceeded in the present process control cycle;

employing the analog input value selected in the last process control cycle to decide process control outputs in the present process control cycle where said predefined tolerance was exceeded during the present process control cycle, but not the immediately prior process control cycle; and using a predetermined magnitude criteria to individually select an analog input value at each of said actively redundant process control computers when it has been determined that said predefined tolerance was exceeded for the present process control cycle and at least the last process control cycle;

wherein each of said corresponding input signals is provided with its own predetermined magnitude criteria which includes at least one bit to alternatively represent a select-high and a select-low basis for selecting the analog input value.

8. The method according to claim 7, including the step of setting an individual compare bit when said corresponding input signals have been determined to exceed said predefined tolerance in the present process control cycle.

9. The method according to claim 7, including the step of setting a general problem bit when any of said corresponding input signals in said block of corresponding input signals have exceeded said predefined tolerance in the present process control cycle.

10. The method according to claim 9, wherein the analog input value selected in the last process control cycle is employed where said predefined tolerance was exceeded during the present process control cycle and said general problem bit was set in the last process control cycle.

11. The method according to claim 7, wherein the same predefined tolerance is provided for each of said corresponding input signals.

12. The method according to claim 11, wherein said predefined tolerance is a percentage of full scale.

13. The method according to claim 12, wherein said percentage of full scale includes both a positive and negative percentage of full scale for at least one of said corresponding input values.

14. The method according to claim 7, further including the step of recording an indication at each of said actively redundant process control computers to identify which of the corresponding input signals were selected by that actively redundant process control computer.

15. A method of input signal resolution in a process control system having a plurality of actively redundant process control computers, where each of said actively redundant process control computers receives corresponding input signals which represent analog values from a physical process being controlled with each process control cycle, comprising the steps of:

mutually exchanging at least one block of said corresponding input signals between each of said actively redundant process control computers;

determining if a predefined tolerance has been exceeded between the analog values of at least some of said corresponding input signals, and if said predefined tolerance was exceeded during the present process control cycle, then determining if said predefined tolerance was also exceeded in at least the last process control cycle;

individually selecting an analog input value at each of said actively redundant process control computers for each of said input signals exchanged where said predefined tolerance was not exceeded in the present process control cycle; and employing the analog input value selected in the last process control cycle to decide process control outputs in the present process control cycle where said predefined tolerance was exceeded during the process control cycle, but not the immediately prior process control cycle;

wherein a plurality of blocks of said corresponding input signals are mutually exchanged between each of said actively redundant process control computers, and each of said blocks of corresponding input signals includes at least one word which represents the validity of the input signals contained in said block and wherein said mutual exchange step includes the steps of determining a validity indicator from said block of corresponding input signals as received, and comparing said determined validity indicator with the validity indicator that was received with a block of corresponding input signals to determine the validity of said mutual exchange step.

16. A method of input signal resolution in a process control system having a plurality of actively redundant process control computers, and at least one triply redundant computer unit which selects an analog input value from at least one set of corresponding analog input signals by at least two of three computers contained in said triply redundant computer unit; comprising the steps of:

transmitting said input value selected from each of said two computers contained in said triply redundant computer unit to at least one of said actively redundant process control computers;

determining if a predefined tolerance has been exceeded between the analog values of said transmitted signals at each of said actively redundant process control computers;

using a predetermined magnitude criteria to individually select the analog input value to be employed in process control decisions at each of said actively redundant process control computers when it has been determined that said predefined tolerance was exceeded;

wherein each of said corresponding analog input signals is provided with its own predetermined magnitude criteria; and wherein said predetermined magnitude criteria includes at least one bit to alternatively represent a select-high and a select-low basis for selecting the analog input value.

17. The method according to claim 16, including the step of setting an individual compare bit when the analog values of said transmitted input signals have exceeded said predefined tolerance.

18. The method according to claim 16, including the step of setting a general problem bit when any of the analog values of said transmitted input signals have exceeded said predefined tolerance.

19. The method according to claim 16, including the step of mutually exchanging a least one set of said transmitted input signals between each of said actively redundant process control computers.

20. The method according to claim 16, including the step of recording an indication at each of said actively redundant process control computers to identify which of the transmitted input signals were selected by that actively redundant process control computer.

* * * * *